(12) United States Patent
Berkey et al.

(10) Patent No.: US 10,884,184 B2
(45) Date of Patent: Jan. 5, 2021

(54) BROMINE-DOPED OPTICAL FIBER

(71) Applicant: Corning Incorporated, Corning, NY (US)

(72) Inventors: George Edward Berkey, Pine City, NY (US); Steven Bruce Dawes, Corning, NY (US)

(73) Assignee: Corning Incorporated, Corning, NY (US)

( * ) Notice: Subject to any disclaimer, the term of this patent is extended or adjusted under 35 U.S.C. 154(b) by 388 days.

(21) Appl. No.: 15/378,356

(22) Filed: Dec. 14, 2016

(65) Prior Publication Data

US 2017/0176673 A1 Jun. 22, 2017

Related U.S. Application Data

(60) Provisional application No. 62/270,703, filed on Dec. 22, 2015.

(51) Int. Cl.
*G02B 6/02* (2006.01)
*G02B 6/036* (2006.01)
(Continued)

(52) U.S. Cl.
CPC ...... *G02B 6/03627* (2013.01); *C03B 19/1453* (2013.01); *C03B 32/00* (2013.01);
(Continued)

(58) Field of Classification Search
CPC ............ G02B 6/03627; G02B 6/02009; C03B 37/01446; C03B 37/01453; C03B 37/025; C03B 2201/12; C03B 2201/20
See application file for complete search history.

(56) References Cited

U.S. PATENT DOCUMENTS 479,120 A * 7/1892 Hinsdale ................ B22D 18/04
164/133
4,341,541 A * 7/1982 Dabby .............. C03B 37/01446
65/32.4
(Continued)

FOREIGN PATENT DOCUMENTS

EP 0479120 A2 4/1992
EP 3012235 A2 4/2016
(Continued)

OTHER PUBLICATIONS

I.V. Nikolin, "Silica Glasses and Optical Fibers Prepared by Plasma Chemical Vapor Deposition Using Bromide Precursors," Inorganic Materials, V. 39, N. 8, pp. 871-876 (2003). (Year: 2003).*
(Continued)

*Primary Examiner* — Peter Radkowski
(74) *Attorney, Agent, or Firm* — Kevin L. Bray

(57) ABSTRACT

Bromine doping of silica glass is demonstrated. Bromine doping can be achieved with $SiBr_4$ as a precursor. Bromine doping can occur during heating, consolidation or sintering of a porous silica glass body. Doping concentrations of bromine increase with increasing pressure of the doping precursor and can be modeled with a power law equation in which doping concentration is proportional to the square root of the pressure of the doping precursor. Bromine is an updopant in silica and the relative refractive index of silica increases approximately linearly with doping concentration. Bromine can be used as a dopant for optical fibers and can be incorporated in the core and/or cladding regions. Core doping concentrations of bromine are sufficient to permit use of undoped silica as an inner cladding material in fibers having a trench in the refractive index profile. Co-doping of silica glass with bromine and chlorine is also demonstrated.

15 Claims, 14 Drawing Sheets

(51) Int. Cl.
*C03C 13/04* (2006.01)
*C03B 19/14* (2006.01)
*C03C 3/06* (2006.01)
*C03B 32/00* (2006.01)
*C03B 37/014* (2006.01)
*C03B 37/025* (2006.01)

(52) U.S. Cl.
CPC .. *C03B 37/01446* (2013.01); *C03B 37/01453* (2013.01); *C03B 37/025* (2013.01); *C03C 3/06* (2013.01); *C03C 13/045* (2013.01); *G02B 6/02009* (2013.01); *G02B 6/036* (2013.01); *G02B 6/03622* (2013.01); *C03B 2201/02* (2013.01); *C03B 2201/12* (2013.01); *C03B 2201/20* (2013.01); *C03B 2201/31* (2013.01); *C03B 2203/23* (2013.01); *C03B 2203/24* (2013.01); *C03C 2201/11* (2013.01); *C03C 2201/12* (2013.01); *C03C 2201/20* (2013.01); *C03C 2201/31* (2013.01); *C03C 2203/54* (2013.01)

(56) References Cited

U.S. PATENT DOCUMENTS

| | | | | |
|---|---|---|---|---|
| 5,313,547 A * | 5/1994 | Lambard | ........ | C03C 3/32 385/142 |
| 5,410,567 A * | 4/1995 | Brundage | ........ | C03B 37/029 219/635 |
| 5,547,482 A * | 8/1996 | Chalk | ........ | C03B 19/06 65/17.2 |
| 5,708,752 A * | 1/1998 | Noda | ........ | C03C 13/042 385/141 |
| 6,027,062 A * | 2/2000 | Bacon | ........ | B65H 57/003 242/157.1 |
| 6,486,947 B2 * | 11/2002 | Modlin | ........ | B01L 3/50853 356/244 |
| 6,658,190 B2 * | 12/2003 | Hirano | ........ | G02B 6/02019 385/123 |
| 7,366,386 B2 * | 4/2008 | Sako | ........ | G02B 6/02004 385/114 |
| 7,565,820 B2 * | 7/2009 | Foster | ........ | C03B 37/02718 65/384 |
| 7,787,732 B2 * | 8/2010 | Sugizaki | ........ | G02B 6/02004 385/123 |
| 7,832,675 B2 * | 11/2010 | Bumgarner | ........ | B65H 54/88 242/157.1 |
| 8,815,103 B2 * | 8/2014 | Bookbinder | ........ | C03B 37/01466 216/24 |
| 8,877,662 B2 * | 11/2014 | Cassingham | ........ | C03C 1/02 501/54 |
| 9,108,876 B2 * | 8/2015 | Dawes | ........ | C03B 37/01853 |
| 9,658,395 B2 * | 5/2017 | Borel | ........ | G02B 6/0365 |
| 2003/0063878 A1 * | 4/2003 | Matsuo | ........ | C03B 37/01228 385/123 |
| 2004/0240814 A1 * | 12/2004 | Boek | ........ | C03B 37/01446 385/123 |
| 2006/0130529 A1 * | 6/2006 | Bookbinder | ........ | C03B 19/1453 65/394 |
| 2006/0198589 A1 * | 9/2006 | Sako | ........ | G02B 6/02004 385/123 |
| 2009/0086770 A1 * | 4/2009 | Sugizaki | ........ | G02B 6/02004 372/6 |
| 2012/0125053 A1 * | 5/2012 | Bookbinder | ........ | C03B 37/0253 65/378 |
| 2013/0116108 A1 * | 5/2013 | Cassingham | ........ | C03C 1/02 501/54 |
| 2013/0136406 A1 * | 5/2013 | Bookbinder | ........ | G02B 6/028 385/124 |
| 2014/0050118 A1 * | 2/2014 | Chow | ........ | H04W 48/08 370/254 |
| 2014/0060118 A1 * | 3/2014 | Dawes | ........ | C03B 37/01853 65/398 |
| 2014/0294355 A1 * | 10/2014 | Bickham | ........ | G02B 6/02019 385/128 |
| 2015/0225280 A1 * | 8/2015 | Harper | ........ | C03B 37/01446 65/399 |
| 2016/0109651 A1 * | 4/2016 | Borel | ........ | C03B 37/01446 385/128 |

FOREIGN PATENT DOCUMENTS

| | | | | |
|---|---|---|---|---|
| WO | WO 2010138472 A1 * | 12/2010 | ....... | C04B 35/62231 |
| WO | 2016007806 A1 | 1/2016 | | |
| WO | WO 2016007806 A1 * | 1/2016 | ......... | G02B 6/02019 |
| WO | 2016086013 A1 | 6/2016 | | |
| WO | WO 2016086013 A1 * | 6/2016 | ....... | C03B 37/01446 |
| WO | 2016168042 A1 | 10/2016 | | |
| WO | WO 2016168042 A1 * | 10/2016 | ............. | C03C 3/06 |

OTHER PUBLICATIONS

International Search Report and Written Opinion PCT/US2016/066251 dated Mar. 30, 2017.

I.V. Nikolin, "Silica Glasses and Optical Fibers Prepared by Plasma Chemical Vapor Deposition using Bromide Precursors", Inorganic Materials vol. 39, No. 8, 2003, pp. 871-876.

\* cited by examiner

BROMINE-DOPED OPTICAL FIBER

This application claims the benefit of priority under 35 U.S.C. § 119 of U.S. Provisional Application Ser. No. 62/270,703 filed on Dec. 22, 2015 the content of which is relied upon and incorporated herein by reference in its entirety.

FIELD

This specification pertains to optical fibers. More particularly, this specification pertains to optical fibers doped with bromine. Most particular, this specification pertains to an optical fiber having a high index core doped with bromine.

BACKGROUND

Optical fiber performance depends on the ability to control refractive index profiles in low loss media. Most typically, silica glass is used as the basis for optical fiber that is used to transmit light over lengths of greater than a few meters to hundreds of kilometers, as the spectral attenuation in the 1300 to 1500 nm range is low, practically as low as 0.18 dB/km for typical single mode fiber products. Optical loss is determined by the Rayleigh scattering of the silica based medium, the concentration of impurities, and wavelength dependent factors such as UV and IR absorption tails. In most single mode fibers, germanium oxide ($GeO_2$) is used to dope a core region of silica glass, increasing the index by 0.35%. Although $GeO_2$ is a relatively expensive dopant, it comprises only about 8% by weight of the core region of the fiber and only about 0.5 wt % of the total glass portion fiber (core+cladding). Germanium doping is also relatively easy to accomplish during blank laydown and complex refractive index profiles can be made simply by varying the ratio of silica and germanium precursors supplied to the burners in an OVD process. $SiCl_4$ and $GeCl_4$ are common precursors for forming Ge-doped silica glass in the core laydown process. A drawback of using Ge as an index-raising dopant for silica cores is that the presence of Ge increases the Rayleigh scattering of the fiber relative to pure silica fibers. As a result, there is interest in identifying alternate dopants that enable the refractive index profile control needed in optical fibers to achieve fibers at reasonable cost that exhibit lower attenuation losses due to Rayleigh scattering.

Two approaches for producing ultralow loss fibers have been commercialized. In one approach, a silica core is modified by alkali doping at low concentration (e.g. 0.1 wt % $K_2O$ or less). The alkali doping concentration is designed to be (1) high enough to reduce Rayleigh scattering by lowering the viscosity of the glass to a degree sufficient to produce a fiber core with a low fictive temperature and (2) sufficiently low to avoid increases in Rayleigh scattering resulting from compositional inhomogeneities. Since alkali doping at low concentration does not lead to a significant increase in the refractive index of the core relative to undoped silica, the refractive index profile is controlled by doping a surrounding silica cladding with F (fluorine). The presence of fluorine in the silica cladding reduces the refractive index of the cladding relative to undoped silica and provides a mechanism for achieving the core-cladding refractive index contrast needed for effective waveguiding in an optical fiber. The process required to make fibers with alkali-doped cores is complicated and expensive, but attenuation of ~0.15 dB/km is possible A second approach to making lower loss fiber is to use Cl (chlorine) as a dopant in the core. Since chlorine doping can be accomplished in the consolidation step, process variables (e.g. blank size, silica precursor) affecting costs associated with core fabrication can be re-optimized. The presence of Cl in the core, even at modest concentrations, does not strongly influence the contribution of compositional inhomogeneity to Rayleigh scattering mechanism and fibers with Cl-doped cores can exhibit low losses due to Rayleigh scattering. Regarding control of the refractive index profile, data for commercial fibers indicate that addition of 1 wt % Cl to the core increases the core index by about 0.08% in the core. Proper control of the refractive index profile requires about 0.5 to 1 wt % fluorine doping in the cladding. A fiber with a Cl-doped core and an F-doped clad exhibits attenuation losses <0.16 dB/km. Chlorine, however, does not lower the viscosity of silica as much as potassium. Consequently, in order to keep the fictive temperature of the core low and to minimize stresses during draw, the fiber needs to be drawn at very slow rates. The slow draw rates increase the cost of production.

Doping of the cladding with F is also a cost-intensive step that would be desirable to avoid. F-doping of the cladding is needed to lower the index of the cladding to achieve a proper core-cladding index contrast. The need for F-doping of the cladding reflects a limitation in the maximum doping concentration of the core silica glass with Cl. Under typical commercial process conditions, Cl doping of silica is limited to about 1 wt %. The refractive index increases associated with doping of the core with 1 wt % Cl is insufficient relative to an undoped silica glass cladding to provide the core-cladding index desired for an optical fiber. As a result, the cladding is doped with F to lower the cladding index.

Efforts are underway to further increase Cl doping levels in the core, but have been limited by practical considerations of process equipment. Current consolidation processes are run in furnaces that are equipped to supply vapor phase constituents at atmospheric pressure or less. Cl doping during consolidation using $SiCl_4$, or other silicon chloride species, appears to show a thermodynamic equilibrium that limits the concentration of Cl ([Cl]) incorporated in the core silica glass to an amount consistent with the empirical relation: $[Cl]=2.3*P_{SiCl}^{1/4}$, where $P_{SiCl4}$ is the pressure of the Cl-doping precursor ($SiCl_4$) over the glass. As a result, in a process with a maximum pressure of 1 atmosphere, the highest Cl doping concentration is 2.3 wt %. The refractive index increase relative to undoped silica for 2.3 wt % Cl doping is only about $\Delta=0.18\%$, which is insufficient to achieve fibers having adequate effective area and low bend losses when undoped silica is used as the cladding material. F-doping of the cladding is thus necessitated. Cl doping levels on the order of 3 wt % or higher are needed to achieve a core refractive index sufficiently high to obviate the need for fluorine doping of the cladding. Predicted process pressures for Cl doping on the order of 5 to 30 atmospheres are needed to permit use of undoped silica as a cladding material. Such process pressures are beyond the capabilities of standard process equipment and require costly specialized equipment.

It would be desirable to develop an optical fiber having a doped silica core that is compatible with use of an undoped or lightly-doped silica cladding.

SUMMARY

Bromine doping of silica glass is demonstrated. Bromine doping can be achieved with $SiBr_4$ as a precursor. Bromine doping can occur during heating, consolidation or sintering of a porous silica soot body. Doping concentrations of bromine increase with increasing pressure of the doping precursor and can be modelled, over dopant pressures up to at least 1 atm, with a power law equation in which doping concentration is proportional to the square root of the pressure of the doping precursor. Bromine is an updopant in silica and the relative refractive index of silica increases approximately linearly with doping concentration. Bromine can be used as a dopant for optical fibers and can be incorporated in the core and/or cladding regions. Core doping concentrations of bromine are sufficient to permit use of undoped silica as an inner cladding material in fibers having a trench in the refractive index profile. Co-doping of silica glass with bromine and chlorine is also demonstrated.

The doping concentration of Br in a silica glass core may be in the range from 0.01 wt %-4.0 wt %, or in the range from 0.5 wt %-4.0 wt %, or in the range from 1.0 wt %-3.5 wt %, or in the range from 1.5 wt %-3.0 wt %, or in the range from 1.75 wt %-2.75 wt %.

The doping concentration of Br in a silica glass core may be in the range from 0.5 wt %-4.0 wt % and the inner cladding region may be undoped silica glass, or the doping concentration of Br in a silica glass core may be in the range from 1.0 wt %-3.5 wt % and the inner cladding region may be undoped silica glass, or the doping concentration of Br in a silica glass core may be in the range from 1.5 wt %-3.0 wt % and the inner cladding region may be undoped silica glass, or the doping concentration of Br in a silica glass core may be in the range from 1.75 wt %-2.75 wt % and the inner cladding region may be undoped silica glass.

In one embodiment, the outer cladding region is silica glass doped with Br and the Br concentration is in the range from 0.01 wt %-3.0 wt %, or in the range from 0.01 wt %-2.5 wt %, or in the range from 0.01 wt %-2.0 wt %. In another embodiment, the core is Br-doped silica glass and the outer cladding is Br-doped silica glass, where the Br doping concentration in the core is greater than the Br doping concentration of the outer cladding.

The present disclosure extends to:
An optical fiber comprising Br.
The present disclosure extends to:
A method comprising doping a soot body with Br.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
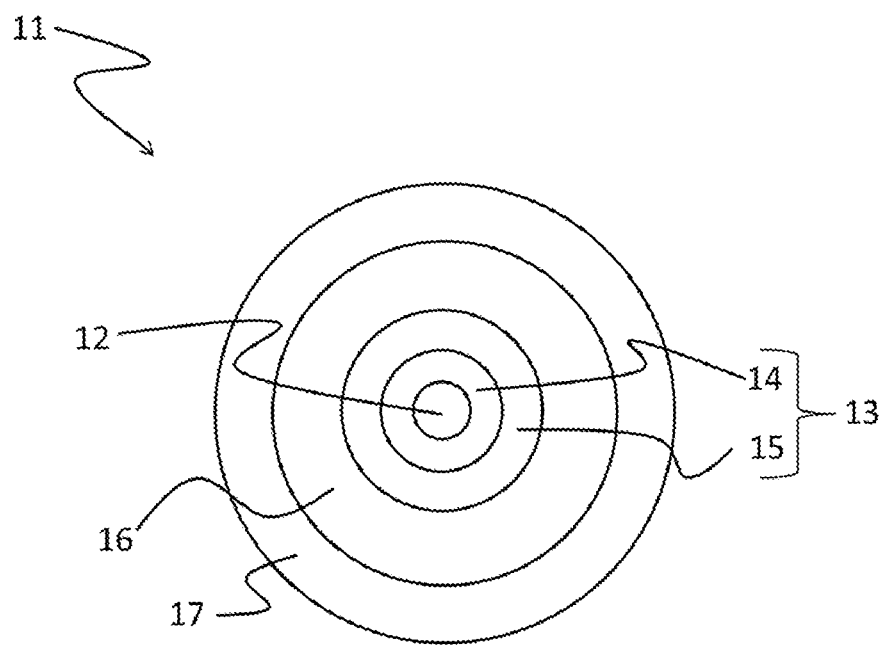
FIG. 1 depicts the cross-section of an optical fiber having a core, an inner cladding, an outer cladding, a primary coating, and a secondary coating.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and/or C are disclosed as well as a class of substituents D, E, and/or F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

"Radial position" or the radial coordinate "r" refers to radial position relative to the centerline (r=0) of the fiber. The length dimension "micron" may referred to herein as micron (or microns) or μm. Areal dimensions based on microns may be referred to herein as micron or μm².

The "refractive index profile" is the relationship between refractive index or relative refractive index and fiber radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" of an optical fiber is defined as:

$$\Delta\% = 100 \frac{n^2(r) - n_{ref}^2}{2n^2(r)}$$

where n(r) is the refractive index of the fiber at the radial distance r from the fiber's centerline, unless otherwise specified, and $n_{Ref}$ is 1.44413, which the refractive index of undoped silica glass at a wavelength of 1550 nm. As used herein, the relative refractive index is represented by Δ (or "delta") or Δ% (or "delta %") and its values are given in units of "%", unless otherwise specified. Relative refractive index may also be expressed as Δ(r) or Δ(r) %.

The term "α-profile" (also referred to as an "alpha profile") refers to a relative refractive index profile Δ(r) that has the following functional form:

$$\Delta(r) = \Delta(r_0)\left[1 - \left[\frac{|r - r_0|}{(r_1 - r_0)}\right]^\alpha\right]$$

where $r_o$ is the point at which Δ(r) is maximum, $r_1$ is the point at which Δ(r) is zero, and r is in the range $r_i \leq r \leq r_f$, where $r_i$ is the initial point of the α-profile, $r_f$ is the final point of the α-profile, and a is a real number. In some embodiments, examples shown herein can have a core alpha of 1≤α≤100. In some embodiments, examples shown herein can have a core alpha of 1≤α≤10. In some embodiments, examples shown herein can have a core alpha of 10≤α≤100. In some embodiments, examples shown herein can have a core alpha of 10≤α≤30.

"Trench volume" is defined as:

$$V_{Trench} = \left|2\int_{r_{Trench,inner}}^{r_{Trench,outer}} \Delta_{Trench}(r) r \, dr\right|$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % Δmicron², % Δ-micron², % Δ-μm², or % Δμm², whereby these units can be used interchangeably herein.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but do touch an intervening material or series of intervening materials, where the intervening material or at least one of the series of intervening materials touches the other. Elements in contact may be rigidly or non-rigidly joined. Contacting refers to placing two elements in direct or indirect contact. Elements in direct (indirect) contact may be said to directly (indirectly) contact each other.

Reference will now be made in detail to illustrative embodiments of the present specification.

The present specification describes optical fibers. The fibers include a core and a cladding surrounding the core. The fibers may also include a primary coating surrounding the cladding region, and a secondary coating surrounding the primary coating. The cladding may be directly adjacent the core. The primary coating may be directly adjacent the cladding. The secondary coating may be directly adjacent the primary coating. The cladding region may include an inner cladding region and an outer cladding region. The outer cladding region may be directly adjacent the inner cladding region. The inner cladding region may be directly adjacent the core. The primary coating may be directly adjacent the outer cladding regions. As used herein, "directly adjacent" means in direct contact with, where direct contact refers to a touching relationship. In alternative embodiments, intervening layers or regions may be present between the core and cladding, or between the cladding and primary coating, or between the primary coating and secondary coating, or between the inner cladding region and core, or between the outer cladding region and the inner cladding regions, or between the primary coating and the outer cladding region. Elements within a fiber that are separated by one or more intervening regions or layers are referred to herein as being "indirectly adjacent" and are in indirect contact with each other. The term "adjacent" encompasses elements that are directly or indirectly adjacent to each other.

Whenever used herein, radius $r_1$ and relative refractive index $\Delta_1(r)$ refer to the core, radius $r_2$ and relative refractive index $\Delta_2(r)$ refer to the inner cladding region, and radius $r_3$ and relative refractive index $\Delta_3(r)$ refer to the outer cladding region. It is understood that the core forms the central portion of the fiber and is substantially cylindrical in shape. It is further understood that the surrounding inner cladding region and surrounding outer cladding region are substantially annular in shape. Annular regions may be characterized in terms of an inner radius and an outer radius. Radial positions $r_1$, $r_2$, and $r_3$ refer herein to the outermost radii of the core, inner cladding region, and outer cladding region, respectively. When two regions are directly adjacent to each other, the outer radius of the inner region coincides with the inner radius of the outer region. In one embodiment, for example, the fiber includes an inner cladding region surrounded by and directly adjacent to an outer cladding region. In such an embodiment, the radius $r_2$ corresponds to the outer radius of the inner cladding region and the inner radius of the outer cladding region.

The relative refractive indices of the core, inner cladding region, and outer cladding region may differ. Each of the regions may be formed from silica glass or a silica-based glass. A silica-based glass is silica glass doped or modified with one or more elements with silica being the majority constituent. Variations in refractive index may be accomplished by incorporating updopants or downdopants at levels known to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. Regions of constant refractive index may be formed by not doping or by doping at a uniform concentration. Regions of variable refractive index may be formed through non-uniform spatial distributions of dopants.

A schematic cross-sectional depiction of a first of many coated fibers in accordance with the present disclosure is shown in FIG. 1. Fiber 11 includes core 12, cladding 13, primary coating 16, and secondary coating 17. Cladding 13 includes inner cladding region 14 and outer cladding region 15.

Figure 2:
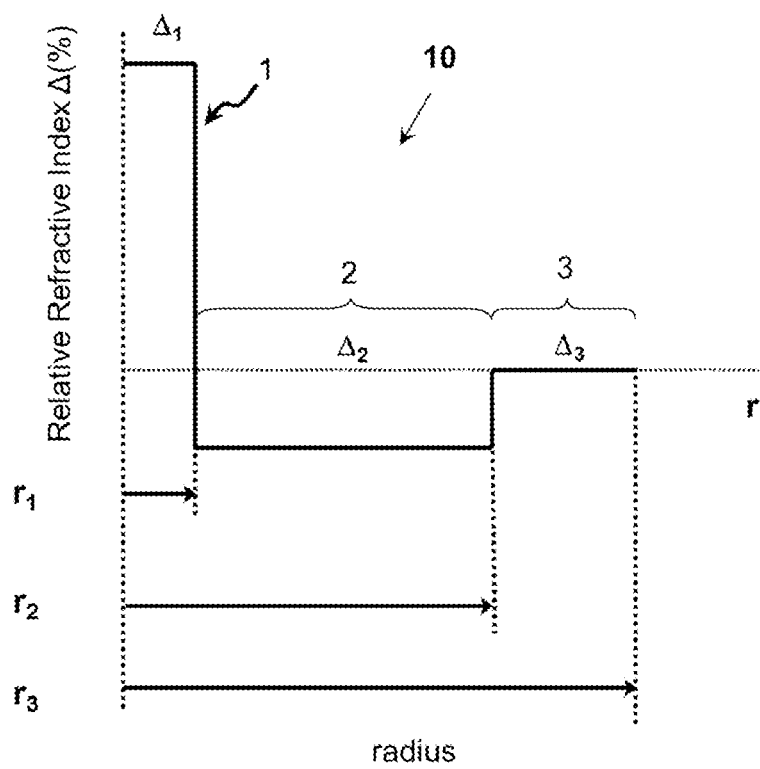
FIG. 2 depicts a relative refractive index profile for an optical fiber having a core, an inner cladding, and an outer cladding.

A representative refractive index profile for the glass portion (core and cladding regions) of an optical fiber is presented in FIG. 2. FIG. 2 shows a relative refractive index profile for a fiber having a core (1) with outer radius $r_1$ and relative refractive index $\Delta_1$, an inner cladding region (2) extending from radial position $r_1$ to radial position $r_2$ and having relative refractive index $\Delta_2$, and an outer cladding region (3) extending from radial position $r_2$ to radial position $r_3$ and having relative refractive index $\Delta_3$. Core region (1) has the highest relative refractive index in the profile. Core region (1) may include a lower index region at or near the centerline (known in the art as a "centerline dip") (not shown). In the embodiment shown in FIG. 2, outer cladding region 3 is directly adjacent inner cladding region 2, which is directly adjacent core 1.

In the refractive index profile depicted in FIG. 2 is a step index profile in which the refractive index in the core, inner cladding and outer cladding regions is constant or approximately constant. It is understood, however, that the refractive index profile may include regions having a non-constant relative refractive index. In one embodiment, for example, the relative refractive index of the core region is described by an α-profile.

A relative refractive index profile of the type shown in FIG. 2 can be achieved by updoping silica glass with Br to form core region (1), downdoping silica glass (e.g. with F) to form inner cladding region (2), and using undoped silica glass for outer cladding region (3).

Figure 3:
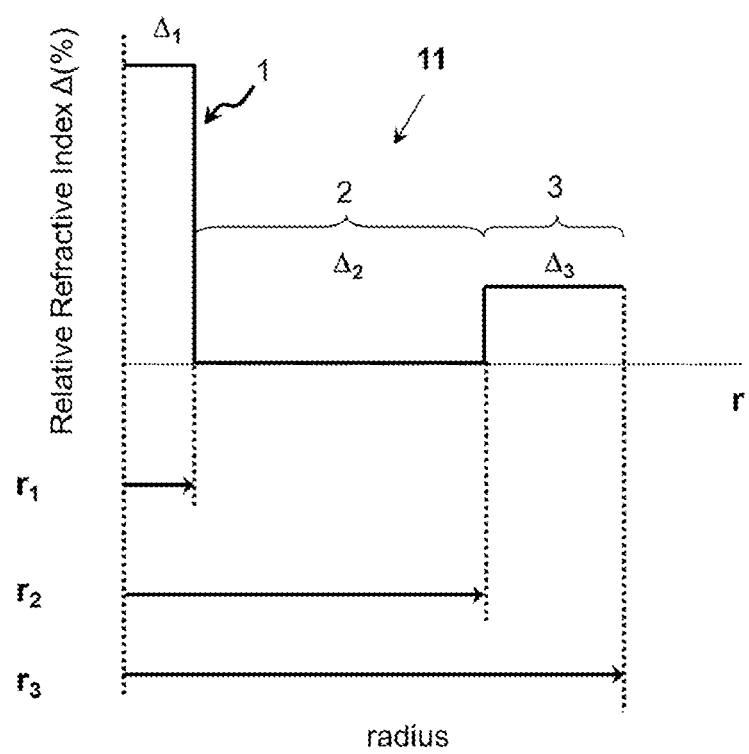
FIG. 3 depicts a relative refractive index profile for an optical fiber having a core, an inner cladding, and an outer cladding.

FIG. 3 shows an alternative relative refractive index profile 11 that can be obtained by updoping silica glass with Br to form core region (1), using undoped silica glass for inner cladding region (2), and updoping silica glass with Br to form outer cladding region (3). To insure that $\Delta_1 > \Delta_3$, the concentration of Br doping is higher in core region (1) than in outer cladding region (3). In another embodiment, the relative refractive index profile 11 shown in FIG. 3 can be obtained by including Br as a dopant in only one of core region (1) and outer cladding region (3) and using a different updopant (e.g. Ge, Cl) in the other of core region (1) and outer cladding region (3).

Figure 4:
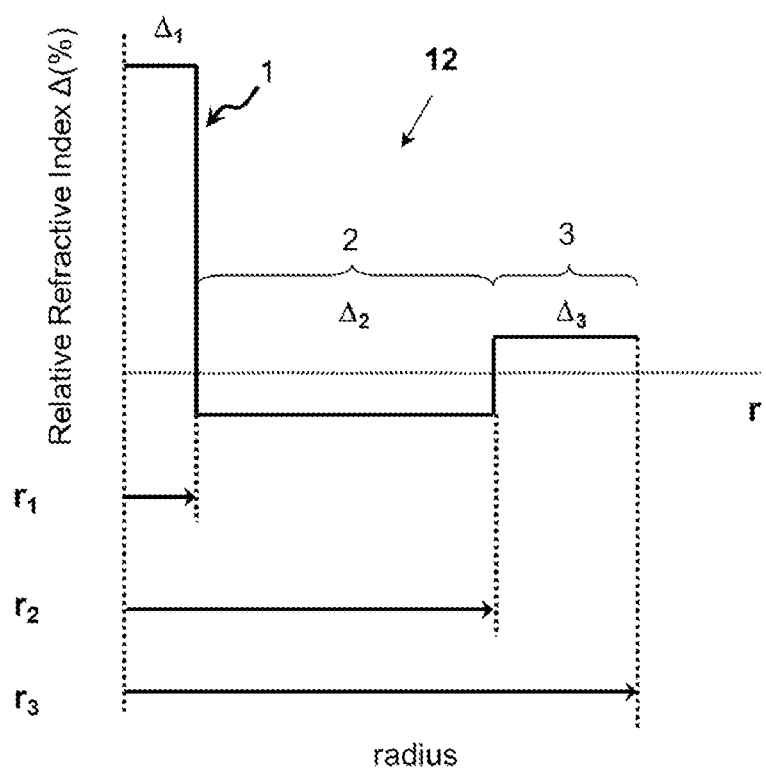
FIG. 4 depicts a relative refractive index profile for an optical fiber having a core, an inner cladding, and an outer cladding.

FIG. 4 shows an embodiment 12 of a relative refractive index profile that can be obtained by updoping silica glass with Br to form core region (1), downdoping silica glass (e.g. with F) to form inner cladding region (2), and updoping silica glass with Br to form outer cladding region (3). To insure that $\Delta_1 > \Delta_3$, the concentration of Br doping is higher in core region (1) than in outer cladding region (3). In another embodiment, the relative refractive index profile 12 shown in FIG. 4 can be obtained by including Br as a dopant in silica glass in only one of core region (1) and outer cladding region (3) and using a different updopant (e.g. Ge, Cl) in the other of core region (1) and outer cladding region (3).

Figure 5:
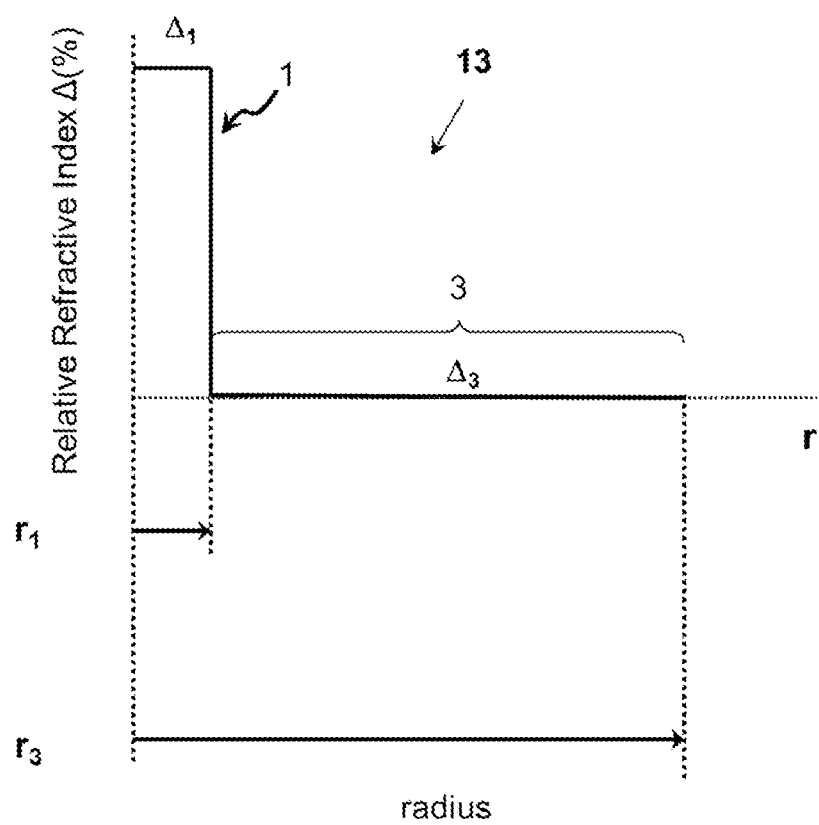
FIG. 5 depicts a relative refractive index profile for an optical fiber having a core and a cladding.

FIG. 5 shows an embodiment 13 of a relative refractive index profile that can be obtained by updoping silica glass with Br to form core region (1) and using undoped silica glass for outer cladding region (3). In this embodiment, inner cladding region (2) is absent and the fiber includes a single cladding region.

Figure 6:
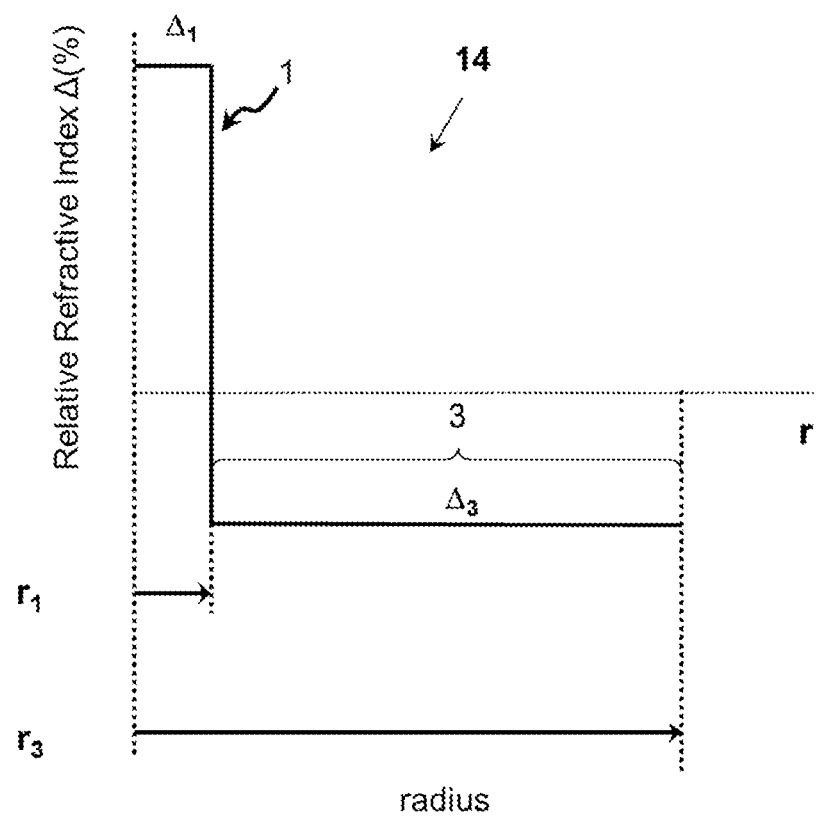
FIG. 6 depicts a relative refractive index profile for an optical fiber having a core and a cladding.

FIG. 6 shows an embodiment 14, which is a variation of embodiment 13, in which the core region (1) is doped with Br and the outer cladding region (3) is doped with F (or other downdopant).

Figure 7:
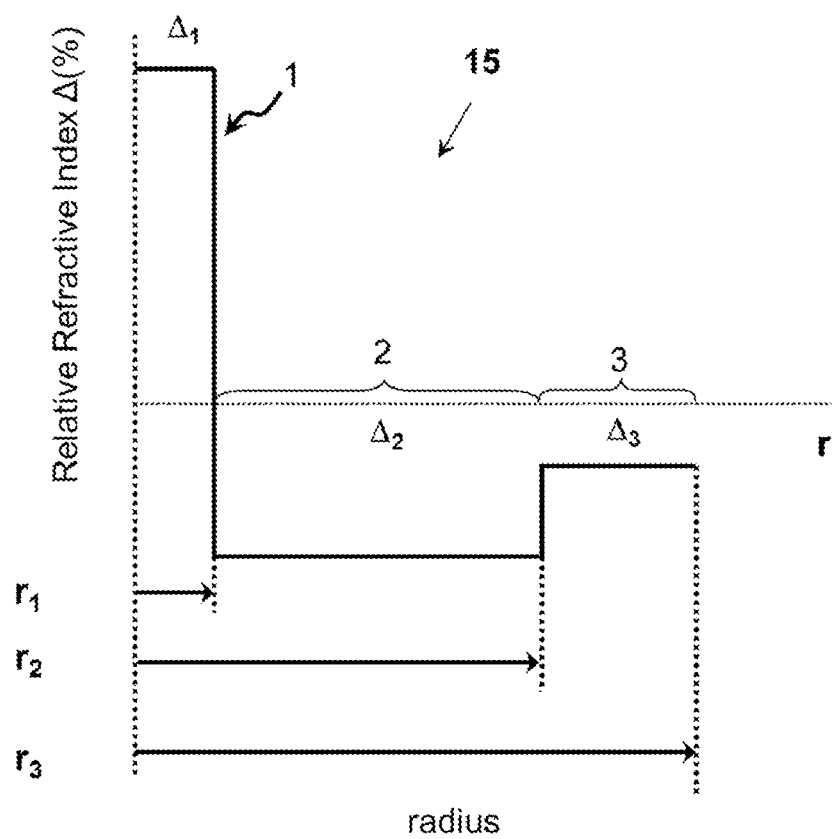
FIG. 7 depicts a relative refractive index profile for an optical fiber having a core, an inner cladding, and an outer cladding.

FIG. 7 shows an embodiment 15 of a relative refractive index profile that can be obtained by updoping silica glass with Br to form core region (1), downdoping silica glass (e.g. with F) to form inner cladding region (2), and downdoping silica glass (e.g. with F) to form outer cladding region (3), where the downdoping of inner cladding region (2) is greater than the downdoping of outer cladding region (3) (e.g. the F doping level of inner cladding region (2) is greater than the F doping level of outer cladding region (3)).

The relative magnitudes of relative refractive indices $\Delta_1$, $\Delta_2$, and $\Delta_3$ influence the waveguiding and bending loss properties of the fiber. In many applications, it is desirable for the fiber to have a large effective area (e.g. to suppress non-linearities in the optical signal). The effective area is controlled in part by the relative refractive index $\Delta_1$ of the core, the radius $r_1$ of the core, and/or the relative refractive index difference $\Delta_1-\Delta_2$ between the core and inner cladding region.

In addition, it is desirable to minimize signal losses that arise when the fiber is bent. It is common in fiber installations to deploy a fiber in a bent configuration. Stresses associated with bending, however, lead to losses in the intensity of optical signals guided by the fiber. It is desirable to develop fibers having low bending losses. Bending losses are controlled in part by the relative refractive index $\Delta_2$ of the inner cladding region, the radius $r_2$ of the inner cladding region, the radial difference $r_2-r_1$, the trench volume of the inner cladding region, the relative refractive index difference $\Delta_1-\Delta_2$ between the core and inner cladding region and/or the relative refractive index difference $\Delta_3-\Delta_2$ between the inner cladding region and the outer cladding region. Inclusion of inner cladding region (2) having a reduced refractive index between core region (1) and outer cladding region (3) reduces bending losses in the fiber. The extent of reduction in bending losses depends on the relative ordering ($\Delta_2<\Delta_3$) and difference ($\Delta_3-\Delta_2$) of the relative refractive indices of inner cladding region (2) and outer cladding region (3). The thickness $r_2-r_1$ of inner cladding region (2) is also important.

The relative refractive index profile depicted in FIG. 2 is representative of profiles used for fibers having large effective area and low bending losses. The relative refractive indices satisfy the condition $\Delta_1>\Delta_3>\Delta_2$, where $\Delta_1$ is greater than zero and each of $\Delta_2$ and $\Delta_3$ may be equal to zero, less than zero or greater than zero. In one embodiment, outer cladding region (3) is pure silica glass ($\Delta=0$), core region (1) is updoped relative to pure silica glass, and inner cladding region (2) is down doped relative to pure silica glass. In another embodiment, inner cladding region (2) is pure silica glass ($\Delta=0$), core region (1) is updoped relative to pure silica glass, and outer cladding region (3) is updoped relative to pure silica glass.

In the low loss fibers currently envisioned, updoping of the core region is accomplished by doping with Ge or Cl. Ge offers the advantage of providing a high increase in core refractive index at modest doping levels, but suffers from the drawback of increased attenuation due to Rayleigh scattering. Rayleigh scattering losses for Cl are lower than for Ge, but it is difficult to achieve core doping concentrations of Cl that are sufficiently high relative to the inner cladding to provide adequate confinement of the optical signal in the core region. As a result, updoping of the core region with Cl is accompanied by downdoping of the inner cladding region with F (fluorine). The need for fluorine doping, however, complicates processing and leads to higher production costs.

The present specification describes use of bromine (Br) as an updopant for silica glass. Br doping of silica and silica-based glasses (including bulk glasses and fibers) is contemplated. Silica-based glasses are glasses that contain silica ($SiO_2$) as a primary component. Silica-based glasses include, but are not limited to, doped silica glasses, silica glasses modified with network formers, and combinations thereof. Br-doping of optical fibers extends to updoping one or more of the core region, the inner cladding region, and the outer cladding region, including fibers having relative refractive index profiles satisfying the conditions $\Delta_1>\Delta_3>\Delta_2$, $\Delta_1>\Delta_2=\Delta_3$, $\Delta_1>\Delta_2=\Delta_3=0$, $\Delta_1>\Delta_3$, $\Delta_1>\Delta_2$, and $\Delta_3>\Delta_2$. The inner cladding region is optional in the present fibers and the outer cladding region may be directly adjacent to the core region. The outer cladding region may be the only cladding region of the fiber and the fiber may be configured such that the outer cladding region surrounds and is directly adjacent to the core region, and such that a coating surrounds and is directly adjacent to the outer cladding region.

The present specification demonstrates that Br is an effective updopant for silica glass and can be used instead of (or in combination with) Ge or Cl as a dopant for the core region of an optical fiber. It is further demonstrated that Br can be incorporated as a dopant in silica glass at concentrations sufficient to increase the refractive index relative to undoped silica glass to a level that provides an index contrast of sufficient magnitude to enable large effective area, low bend loss fibers with a Br-doped silica core region and an undoped silica inner cladding region. Br can be incorporated in one or more of the core, inner cladding, and outer cladding regions of the fiber. Br may be present as a sole dopant or as one dopant in a combination of dopants. Br may be combined with one or more other updopants (e.g. Ge, Cl) or with one or more downdopants (e.g. F, B).

The functional characteristics of optical fibers depend on the relationship between the relative refractive indices of the core, inner cladding, and outer cladding. Since the optical fibers of the present description are suitable for use in a variety of applications (including, without limitation, single mode transmission, short distance transmission, long distance transmission, low attenuation transmission, and low bend loss transmission), optical fibers having relative refractive index profiles spanning a wide range of values of $\Delta_1$, $\Delta_2$, $\Delta_3$, $r_1$, $r_2$, and $r_3$ can be designed in accordance with the principles and doping schemes disclosed herein. The following discussion describes values of $\Delta_1$, $\Delta_2$, $\Delta_3$, $r_1$, $r_2$, and $r_3$ in accordance with the present description. Although values of each parameter ($\Delta_1$, $\Delta_2$, $\Delta_3$, $r_1$, $r_2$, and $r_3$) are described separately, it is understood that the relative refractive index profiles of actual fibers include values for all parameters (except that the inner cladding is optional, so values for $\Delta_2$ and $r_2$ may not be applicable) and that optical fibers with relative refractive index profiles having any and all combinations of values of $\Delta_1$, $\Delta_2$, $\Delta_3$, $r_1$, $r_2$, and $r_3$ described herein are within the scope of the present description.

The relative refractive index $\Delta_1$ of the core may be in the range from 0.10% to 0.65%, or in the range from 0.15% to 0.60%, or in the range from 0.20% to 0.55%, or in the range from 0.25% to 0.50%, or in the range from 0.30% to 0.45%. The radius $r_1$ of the core may be in the range from 3.0 μm to 10.0 μm, or in the range from 3.0 μm to 8.0 μm, or in the range from 4.0 μm to 6.0 μm, or in the range from 5.0 μm to 10.0 μm, or in the range from 6.0 μm to 10.0 μm, or in the range from 6.0 μm to 9.0 μm, or in the range from 6.0 μm to 8.0 μm, or in the range from 6.5 μm to 7.5 μm, or in the range from 7.0 μm to 10.0 μm.

The relative refractive index $\Delta_2$ of the inner cladding region may be 0%, or in the range from −0.40% to 0%, or in the range from −0.25% to 0%, or in the range from −0.20% to −0.05%, or in the range from −0.20% to −0.10%. The radius $r_2$ of the inner cladding region may be in the range from 10 μm to 40 μm, or in the range from 10 μm to 35 μm, or in the range from 15 μm to 40 μm, or in the range from 15 μm to 38 μm, or in the range from 20 μm to 38 μm, or in the range from 20 μm to 35 μm, or in the range from 20 μm to 30 μm, or in the range from 22 μm to 38 μm, or in the range from 22 μm to 35 μm, or in the range from 24 μm to 38 μm, or in the range from 24 μm to 35 μm.

The trench volume of the inner cladding region may be greater than 20% $\Delta\mu m^2$, or greater than 30% $\Delta\mu m^2$, or greater than 40% $\Delta\mu m^2$, or greater than 60% $\Delta\mu m^2$, or greater than 80% $\Delta\mu m^2$, or greater than 100% $\Delta\mu m^2$, or in the range from 20% $\Delta\mu m^2$ to 200% $\Delta\mu m^2$, or in the range from 30% $\Delta\mu m^2$ to 170% $\Delta\mu m^2$, in the range from 40% $\Delta\mu m^2$ to 140% $\Delta\mu m^2$.

The relative refractive index $\Delta_3$ of the outer cladding region may be in the range from −0.40% to 0.15%, or in the range from −0.30% to 0.15%, or in the range from −0.20% to 0.15%, or in the range from −0.10% to 0.20%, or in the range from −0.05% to 0.20%, or in the range from 0% to 0.20%, or in the range from 0.05% to 0.20%, or in the range from −0.10% to 0.15%, or in the range from −0.05% to 0.15%, or in the range from 0% to 0.15%, or in the range from 0.05% to 0.15%, or in the range from −0.10% to 0.10%, or in the range from −0.05% to 0.10%, or in the range from 0% to 0.10%, or in the range from 0.05% to 0.10%. The radius $r_3$ of the outer cladding region may be at least 55 μm, or at least 60 μm, or in the range from 55 μm to 70 μm, or in the range from 55 μm to 65 μm, or in the range from 60 μm to 65 μm, or about 62.5 μm.

The relative refractive index difference $\Delta_1-\Delta_2$ may be at least 0.15%, or at least 0.20%, or at least 0.25%, or at least 0.30%. The relative refractive index difference $\Delta_3-\Delta_2$ may be at least 0.05%, or at least 0.06%, or at least 0.08%, or at least 0.10% or at least 0.12%, or at least 0.15%, or at least 0.20%.

The relative refractive index difference $\Delta_1-\Delta_2$ may be at least 0.15% and the relative refractive index difference $\Delta_3-\Delta_2$ may be at least 0.05%. The relative refractive index difference $\Delta_1-\Delta_2$ may be at least 0.15% and the relative refractive index difference $\Delta_3-\Delta_2$ may be at least 0.06%. The relative refractive index difference $\Delta_1-\Delta_2$ may be at least 0.15% and the relative refractive index difference $\Delta_3-\Delta_2$ may be at least 0.08%. The relative refractive index difference $\Delta_1-\Delta_2$ may be at least 0.15% and the relative refractive index difference $\Delta_3-\Delta_2$ may be at least 0.10%. The relative refractive index difference $\Delta_1-\Delta_2$ may be at least 0.15% and the relative refractive index difference $\Delta_3-\Delta_2$ may be at least 0.12%. The relative refractive index difference $\Delta_1-\Delta_2$ may be at least 0.15% and the relative refractive index difference $\Delta_3-\Delta_2$ may be at least 0.15%. The relative refractive index difference $\Delta_1-\Delta_2$ may be at least 0.15% and the relative refractive index difference $\Delta_3-\Delta_2$ may be at least 0.20%. The relative refractive index difference $\Delta_1-\Delta_2$ may be at least 0.15% and the relative refractive index difference $\Delta_3-\Delta_2$ may be at least 0.25%.

The relative refractive index difference $\Delta_1-\Delta_2$ may be at least 0.20% and the relative refractive index difference $\Delta_3-\Delta_2$ may be at least 0.05%. The relative refractive index difference $\Delta_1-\Delta_2$ may be at least 0.20% and the relative refractive index difference $\Delta_3-\Delta_2$ may be at least 0.06%. The relative refractive index difference $\Delta_1-\Delta_2$ may be at least 0.20% and the relative refractive index difference $\Delta_3-\Delta_2$ may be at least 0.08%. The relative refractive index difference $\Delta_1-\Delta_2$ may be at least 0.20% and the relative refractive index difference $\Delta_3-\Delta_2$ may be at least 0.10%. The relative refractive index difference $\Delta_1-\Delta_2$ may be at least 0.20% and the relative refractive index difference $\Delta_3-\Delta_2$ may be at least 0.12%. The relative refractive index difference $\Delta_1-\Delta_2$ may be at least 0.20% and the relative refractive index difference $\Delta_3-\Delta_2$ may be at least 0.20%. The relative refractive index difference $\Delta_1-\Delta_2$ may be at least 0.20% and the relative refractive index difference $\Delta_3-\Delta_2$ may be at least 0.20%. The relative refractive index difference $\Delta_1-\Delta_2$ may be at least 0.20% and the relative refractive index difference $\Delta_3-\Delta_2$ may be at least 0.25%.

The relative refractive index difference $\Delta_1-\Delta_2$ may be at least 0.25% and the relative refractive index difference $\Delta_3-\Delta_2$ may be at least 0.05%. The relative refractive index difference $\Delta_1-\Delta_2$ may be at least 0.25% and the relative refractive index difference $\Delta_3-\Delta_2$ may be at least 0.06%. The relative refractive index difference $\Delta_1-\Delta_2$ may be at least 0.25% and the relative refractive index difference $\Delta_3-\Delta_2$ may be at least 0.08%. The relative refractive index difference $\Delta_1-\Delta_2$ may be at least 0.25% and the relative refractive index difference $\Delta_3-\Delta_2$ may be at least 0.10%. The relative refractive index difference $\Delta_1-\Delta_2$ may be at least 0.25% and the relative refractive index difference $\Delta_3-\Delta_2$ may be at least 0.12%. The relative refractive index difference $\Delta_1-\Delta_2$ may be at least 0.25% and the relative refractive index difference $\Delta_3-\Delta_2$ may be at least 0.15%. The relative refractive index difference $\Delta_1-\Delta_2$ may be at least 0.25% and the relative refractive index difference $\Delta_3-\Delta_2$ may be at least 0.20%. The relative refractive index difference $\Delta_1-\Delta_2$ may be at least 0.25% and the relative refractive index difference $\Delta_3-\Delta_2$ may be at least 0.25%.

In one embodiment, the optical fiber is a single mode fiber having the relative refractive index profile shown in FIG. 5 with the following parameter values: the relative refractive index $\Delta_1$ of the core region may be 0.35%, or in the range from 0.2%-0.4%, or in the range from 0.1% to 0.45%; the radius $r_1$ of the core region may be in the range from 3 μm to 8 μm, or in the range from 4 μm to 6 μm; the relative refractive index $\Delta_3$ of the outer cladding region may be 0%, or in the range from 0.05% to −0.1%, or in the range from −0.05% to −0.20%, or in the range from −0.10% to −0.20%; the radius $r_3$ of the outer cladding region may be about 62.5 μm or in the range from 60 μm to 65 μm; and the relative refractive index difference $\Delta_1-\Delta_3$ may be at least 0.3% or in the range from 0.3 to 0.45% or about 0.35%.

In one embodiment, the optical fiber is a low bend loss fiber having the relative refractive index profile shown in FIG. 3 with the following parameter values: the relative refractive index $\Delta_1$ of the core region may be about 0.40%, or in the range from 0.20%-0.45%, or in the range from 0.10% to 0.50%; the core region may have an alpha profile; the radius $r_1$ of the core region may be in the range from 3 μm to 8 μm, or in the range from 4 μm to 6 μm; the relative refractive index $\Delta_2$ of the inner cladding region may be about 0%, or in the range from 0.05% to −0.35%, or in the range from 0.10% to −0.30%; the radius $r_2$ of the inner cladding region may be about 13 μm or in the range from 10 μm to 20 μm, or in the range from 8 to 30 μm; the relative refractive index $\Delta_3$ of the outer cladding region may be about 0.05%, or in the range from 0.1% to −0.2%, or in the range from 0.15% to −0.30%; the radius $r_3$ of the inner cladding region may be about 62.5 μm or in the range from 60 μm to 65 μm; the relative refractive index difference $\Delta_1-\Delta_3$ may be at least 0.35% or in the range from 0.30% to 0.45% or about 0.40%; the relative refractive index difference $\Delta_3-\Delta_2$ may be at least 0.0% or in the range from 0.020% to 0.10% or about 0.05%; and the trench volume of the inner cladding region may be greater than 20% $\Delta\mu m^2$, or greater than 30% $\Delta\mu m^2$, or greater than 40% $\Delta\mu m^2$, or in the range from 20% $\Delta\mu m^2$ to 100% $\Delta\mu m^2$, or in the range from 25% $\Delta\mu m^2$ to 75% $\Delta\mu m^2$, or in the range from 30% $\Delta\mu m^2$ to 50% $\Delta\mu m^2$.

In one embodiment, the optical fiber is a low bend loss fiber having the relative refractive index profile shown in FIG. 2 with the following parameter values: the relative refractive index $\Delta_1$ of the core region may be about 0.4%, or in the range from 0.3%-0.45%; the radius $r_1$ of the core region may be in the range from 3 μm to 8 μm, or in the range from 4 μm to 6 μm; the relative refractive index $\Delta_2$ of the inner cladding region may be in the range from −0.3 to −0.5, or in the range from −0.2% to −0.6%; the radius $r_2$ of the inner cladding region may be about 13 μm or in the range from 10 μm to 20 μm, or in the range from 8 to 30 μm; the relative refractive index $\Delta_3$ of the outer cladding region may be about 0.05%, or in the range from 0.1% to −0.2%; the radius $r_3$ of the inner cladding region may be about 62.5 μm or in the range from 60 μm to 65 μm; the relative refractive index difference $\Delta_1-\Delta_3$ may be at least 0.35% or in the range from 0.30 to 0.45% or about 0.40%; the relative refractive index difference $\Delta_3-\Delta_2$ may be at least 0.20% or in the range from 0.20% to 0.60% or in the range from 0.30% to 0.05%. The trench volume of the inner cladding region may be greater than 20% $\Delta\mu m^2$, or greater than 30% 4 $\mu m^2$, or greater than 40% $\Delta\mu m^2$, or greater than 60% $\Delta\mu m^2$, or greater than 80% $\Delta\mu m^2$.

In one embodiment, the optical fiber is a large effective area, low loss fiber having the relative refractive index profile shown in FIG. 3 with the following parameter values: the relative refractive index $\Delta_1$ of the core region may be about 0.24%, or in the range from 0.10% to 0.30%; the radius $r_1$ of the core region may be in the range from 4 μm to 9 μm, or in the range from 5.5 μm to 7.5 μm; the relative refractive index $\Delta_2$ of the inner cladding region may be about −0.10%, or in the range from 0.05% to −0.25%; the radius $r_2$ of the inner cladding region may be about 20 μm or in the range from 20 μm to 30 μm, or in the range from 15 to 35 μm; the relative refractive index $\Delta_3$ of the outer cladding region may be about 0%, or in the range from 0.10% to −0.20%, or in the range from 0.15% to −0.30%; the radius $r_3$ of the inner cladding region may be about 62.5 μm or in the range from 60 μm to 65 μm; the relative refractive index difference $\Delta_1-\Delta_3$ may be at least 0.20% or in the range from 0.20% to 0.30% or about 0.25%; the relative refractive index difference $\Delta_3-\Delta_2$ may be at least 0.03% or in the range from 0.02% to 0.10% or about 0.05%; and the trench volume of the inner cladding region may be greater than 30% $\Delta\mu m^2$, or greater than 40% $\Delta\mu m^2$, or greater than 50% $\Delta\mu m^2$, or about 40% $\Delta\mu m^2$, or in the range from 30% $\Delta\mu m^2$ to 100% $\Delta\mu m^2$, or in the range from 35% $\Delta\mu m^2$ to 80% $\Delta\mu m^2$, or in the range from 40% $\Delta\mu m^2$ to 70% $\Delta\mu m^2$.

The doping concentration of Br in a silica glass core may be in the range from 0.01 wt %-4.0 wt %, or in the range from 0.5 wt %-4.0 wt %, or in the range from 1.0 wt %-3.5 wt %, or in the range from 1.5 wt %-3.0 wt %, or in the range from 1.75 wt %-2.75 wt %. The doping concentration of Br in a silica glass core may be in the range from 0.5 wt %-4.0 wt % and the inner cladding region may be undoped silica glass, or the doping concentration of Br in a silica glass core may be in the range from 1.0 wt %-3.5 wt % and the inner cladding region may be undoped silica glass, or the doping concentration of Br in a silica glass core may be in the range from 1.5 wt %-3.0 wt % and the inner cladding region may be undoped silica glass, or the doping concentration of Br in a silica glass core may be in the range from 1.75 wt %-2.75 wt % and the inner cladding region may be undoped silica glass. In each of the foregoing embodiments, the core may be free of Ge and K.

In alternative embodiments, the inner cladding is silica glass doped with F. The doping concentration of F in the inner cladding region may be in the range from 0.01 wt %-1.0 wt %, or in the range from 0.01 wt %-0.75 wt %, or in the range from 0.01 wt %-0.50 wt %, or in the range from 0.01 wt %-0.25 wt %, or in the range from 0.05 wt %-0.80 wt %, or in the range from 0.05 wt %-0.60 wt %, or in the range from 0.05 wt %-0.40 wt %. The doping concentration of Br in the core may be in the range from 0.01 wt %-4.0 wt % and the doping concentration of F in the inner cladding region may be in the range from 0.01 wt %-1.0 wt %. The doping concentration of Br in the core may be in the range from 0.5 wt %-4.0 wt % and the doping concentration of F in the inner cladding region may be in the range from 0.01 wt %-1.0 wt %. The doping concentration of Br in the core may be in the range from 1.0 wt %-3.5 wt % and the doping concentration of F in the inner cladding region may be in the range from 0.01 wt %-0.80 wt %. The doping concentration of Br in the core may be in the range from 1.5 wt %-3.0 wt % and the doping concentration of F in the inner cladding region may be in the range from 0.01 wt %-0.50 wt %. The doping concentration of Br in the core may be in the range from 0.5 wt %-2.5 wt % and the doping concentration of F in the inner cladding region may be in the range from 0.01 wt %-1.0 wt %. The doping concentration of Br in the core may be in the range from 0.5 wt %-2.5 wt % and the doping concentration of F in the inner cladding region may be in the range from 0.05 wt %-0.90 wt %. The doping concentration of Br in the core may be in the range from 0.5 wt %-2.5 wt % and the doping concentration of F in the inner cladding region may be in the range from 0.10 wt %-0.80 wt %.

The outer cladding region may be undoped silica glass, updoped silica glass (e.g. Br-doped silica glass or Cl-doped silica glass), or downdoped silica glass (e.g. F-doped silica glass). In one embodiment, the outer cladding region is silica glass doped with Br and the Br concentration is in the range from 0.01 wt %-3.0 wt %, or in the range from 0.01 wt %-2.5 wt %, or in the range from 0.01 wt %-2.0 wt %. In another embodiment, the core is Br-doped silica glass and the outer cladding is Br-doped silica glass, where the Br doping concentration in the core is greater than the Br doping concentration of the outer cladding. The Br doping concentration of the core may be at least 10% greater than the Br doping concentration of the outer cladding, or the Br doping concentration of the core may be at least 25% greater than the Br doping concentration of the outer cladding, or the Br doping concentration of the core may be at least 50% greater than the Br doping concentration of the outer cladding, or the Br doping concentration of the core may be at least 100% greater than the Br doping concentration of the outer cladding. In each of the foregoing embodiments, the inner cladding region may be undoped silica glass. In each of the foregoing embodiments, the core may or may not include Ge and/or K. In certain embodiments, the core may be free of Ge, or free of K, or free of Cl, or free of Ge and K, or free of Ge and Cl, or free of K and Cl. In other embodiments, the core may include one or more of Ge, Cl and K.

Optical fibers based on the glass compositions disclosed herein can be produced in a single-step operation or multi-step operation by methods which are well known in the art. Suitable methods include: the flame combustion methods, flame oxidation methods, flame hydrolysis methods, OVD (outside vapor deposition), IVD (inside vapor deposition), VAD (vapor axial deposition), double crucible method, rod-in-tube procedures, cane-in-soot method, and doped deposited silica processes. A variety of CVD processes are known and are suitable for producing the core, inner cladding region, and outer cladding region used in the optical fibers of the present invention. They include external CVD processes, axial vapor deposition processes, modified CVD (MCVD), inside vapor deposition, and plasma-enhanced CVD (PECVD).

Suitable precursors for silica include OMCTS (octamethylcyclotetrasiloxane) and $SiCl_4$. Suitable precursors for bromine doping include $SiBr_4$. Suitable precursors for chlorine doping include $Cl_2$, $SiCl_4$, $Si_2Cl_6$, $Si_2OCl_6$, and $CCl_4$. Suitable precursors for fluorine doping include $F_2$, $CF_4$, and $SiF_4$.

Figure 8:
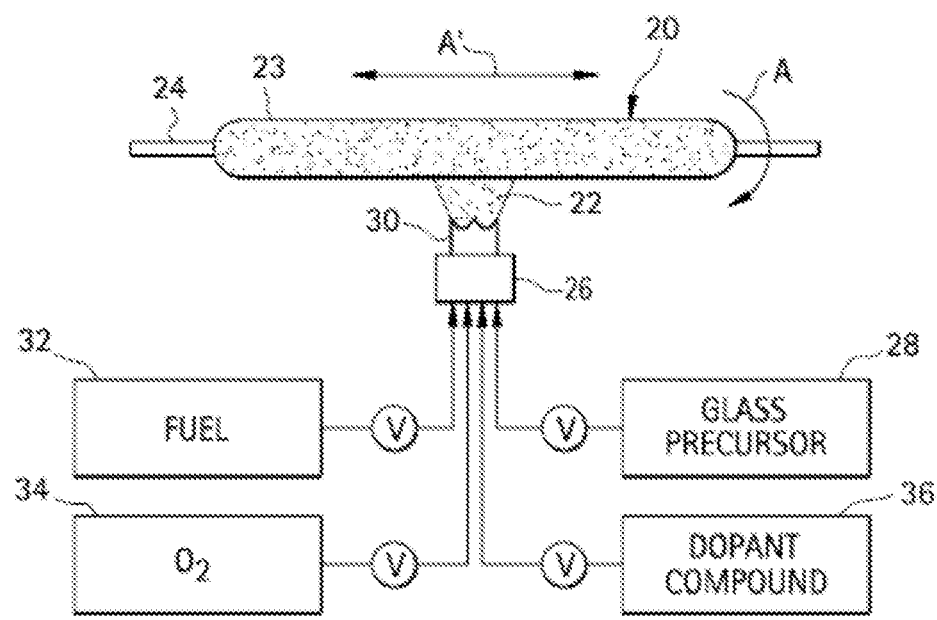
FIG. 8 is a schematic depiction of soot preform deposition via an OVD process.
Figure 9:
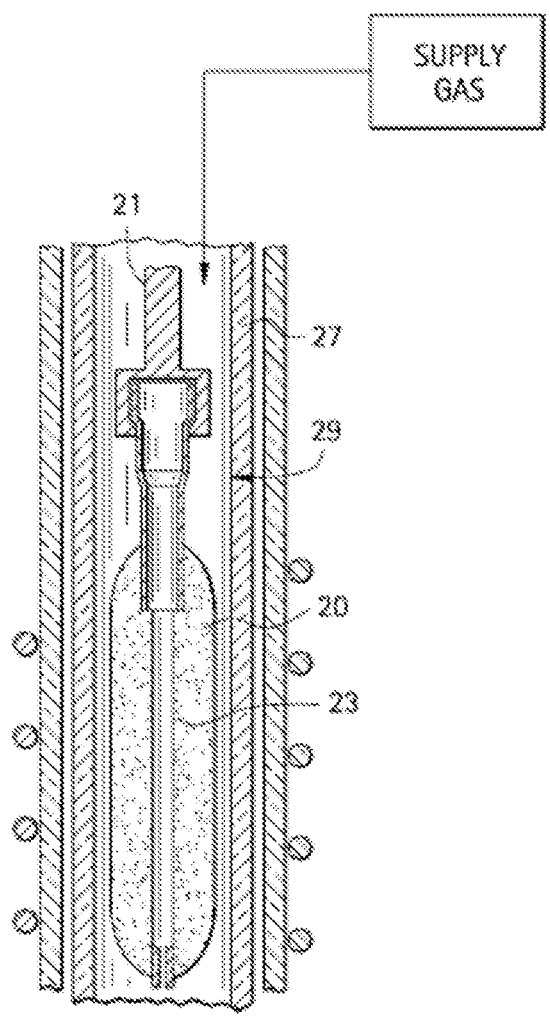
FIG. 9 depicts an apparatus for doping and consolidating a soot preform.

Optical fibers disclosed herein can be made by forming a soot body, consolidating the soot body, and drawing a fiber. By way of example and not intended to be limiting, formation of a silica or doped silica soot body according to the OVD method is illustrated in FIGS. 8 and 9. In FIG. 8, soot body 20 is formed by depositing silica-containing soot 22 onto the outer surface of a rotating and translating bait rod 24. Bait rod 24 is preferably tapered. The soot 22 is formed by providing a glass/soot precursor 28 in gaseous form to the flame 30 of a burner 26 to oxidize it. Fuel 32, such as methane ($CH_4$), and a combustion supporting gas 34, such as oxygen, are provided to the burner 26 and ignited to form the flame 30. Mass flow controllers, labeled V, meter the appropriate amounts of glass/soot precursor 28, fuel 32 and combustion supporting gas 34, all preferably in gaseous form, to the burner 26. The glass/soot precursor 28 is a glass former compound and is oxidized in the flame 30 to form the generally cylindrically-shaped soot region 23, which may correspond to the core of an optical fiber preform.

After forming of the soot core body, as illustrated in FIG. 9, the soot core body 20 including the cylindrical soot region 23 may be doped (e.g. with bromine, chlorine etc.) and consolidated in consolidation furnace 29 to form a consolidated soot core preform. Prior to consolidation, the bait rod 24 illustrated in FIG. 8 is removed to form a hollow, cylindrical soot core preform. During the doping and consolidation process, the soot core body 20 is suspended, for example, inside a pure quartz muffle tube 27 of the furnace 29 by a holding mechanism 21. Prior to or during the consolidation step, the soot core body 20 may be exposed to a dopant precursor. The dopant precursor is preferably provided in gas or vapor form and may be supplied directly to soot core body 20 before or during consolidation. The dopant precursor may be supplied neat or in combination with a diluent gas. The doping concentration can be controlled by controlling, without limitation, the temperature of doping, the temperature of vaporization of a liquid doping precursor, the pressure of a gas or vaporized doping precursor in the processing ambient of the soot preform, time of doping, number of doping cycles, and the porosity or surface area of the soot body (high porosity and/or high surface area promote higher doping concentrations).

In some embodiments, doping occurs during the sintering process, i.e. the soot core body is doped prior to and/or up to the point where the soot core body transforms to a fully densified, closed pore state and becomes a core preform.

During or after the doping step, the core soot body may be sintered. In one embodiment, the sintering process is an isothermal process in which the sintering temperature can be in the range from 1100° C. to 1600° C., or in the range from 1000° C. to 1500° C., or in the range from 1350° C. to 1550° C., or in the range from 1250° C. to 1450° C., or in the range from 1380° C. to 1500° C., or in the range from 1280° C. to 1400° C. An isothermal sintering process may be preferred when the doping precursor is supplied as a neat gas or vapor. In another embodiment, the sintering process is a downdrive process in which a sintering front is established by localized heating and the doping precursor is provided at the sintering front at a concentration (neat or in combination with a diluent) sufficient to accommodate the equilibrium solubility. Depending on the size of the soot body, the thermal conductivity of the soot body, and the heating (downdrive) rate of the soot body, the sinter front may include a radial temperature gradient. That is, at the sinter front, the outer surface of the soot body is exposed to high temperatures and heated and heating of the interior portion follows in time as heat transfers from the outer surface to the interior of the soot body. After sintering, the core preform is fully densified and may be drawn to a smaller diameter and cut into lengths to form consolidated doped silica glass core canes.

Additional soot to form the inner cladding region (or, depending on desired index profile as described hereinabove, sole cladding region) may then be deposited onto the glass core cane using the same method as explained above with respect to the core soot deposition process. The additional soot constitutes a soot body supported by the core cane. As described hereinabove, the inner cladding can be undoped silica or doped silica. Doping of the inner cladding can be accomplished by exposing the inner cladding soot body to a doping precursor before consolidation in the same manner described above for the core soot body. The sintering temperatures for the inner cladding soot body are in the range from 1100° C. to 1600° C., more preferably between about 1400° C. and 1550° C., and most preferably between about 1480° C. and 1550° C. An outer cladding soot body may similarly be formed and optionally doped by depositing soot on the inner cladding (before or after consolidation and/or doping of the inner cladding soot body) and optionally exposing the outer cladding soot body to a doping precursor. The outer cladding soot body may then be consolidated to a denser or fully densified state.

The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which is hereby incorporated by reference. In particular, an optical fiber preform (fully consolidated glass preform with a central core region and one or more surrounding cladding regions) is inserted into a draw furnace and heated to soften the glass. An optical fiber is pulled from a root portion of the optical fiber preform by a tractor. After leaving draw furnace, the bare optical fiber encounters a diameter monitor which provides a signal that is used in a feedback control loop to regulate speed of the tractor to maintain a constant fiber diameter. The bare optical fiber then passes through a fiber tension measurement device that measures the tension of the optical fiber caused by pulling the fiber from the preform. This tension can increase depending on the speed of the fiber draw, the temperature and viscosity of the root of the preform, etc. One example of a fiber tension measurement device is disclosed in EP 0479120 A2 which is hereby incorporated herein by reference. After exiting the draw furnace, the fiber can be further processed in cooling, annealing, reheating, coating and winding steps.

EXAMPLES

Illustrative examples that illustrate Br doping of silica glass will now be described. In the illustrative examples, $SiBr_4$ is used as a Br doping precursor. $SiBr_4$ is a liquid at room conditions and has a boiling point of about 154° C. Liquid $SiBr_4$ can be heated to form vaporized $SiBr_4$. $SiBr_4$ was delivered to silica soot bodies in vaporized form to serve as a Br doping source for the silica soot bodies. Liquid $SiBr_4$ was loaded into a 10 $cm^3$ stainless steel vessel equipped with a closure valve. The vessel was purged with $N_2$ before adding $SiBr_4$ to eliminate water and other contaminants. The reactor used to form Br-doped silica glass consisted of a tube furnace (Sentrotech STT-1600-3-24) with an alumina tube that was sealed at both ends with stainless steel flanges. The stainless steel vessel containing $SiBr_4$ was attached to the furnace with VCR fittings and immersed in an oil bath for heating. A target pressure of $SiBr_4$ was delivered by heating the stainless steel vessel to the temperature needed to evaporate $SiBr_4$ at a vapor pressure consistent with the target pressure. The alumina tube was connected to a vacuum pump and configured to receive delivery of purge gases, dehydrating gases, and vaporized $SiBr_4$. All components of the tube furnace were maintained at temperatures sufficiently high to prevent condensation of vaporized $SiBr_4$. Exhaust gases from the tube furnace were passed through a scrubber to remove halides before release to a hood.

Br doping of various forms of undoped silica is demonstrated in the illustrative examples. The undoped silica starting materials are soot bodies and may be referred to herein as substrates or silica substrates. The silica substrates differed in density and were included to show the ability to dope silica substrates of varying porosity with Br. A listing of silica substrates is provided in Table 1. Multiple specimens of each substrate were used in the illustrative examples described below using $SiBr_4$ under various conditions as a doping precursor for Br.

TABLE 1

Summary of Silica Substrates used in Br-doping Experiments

| Silica Substrate | Origin | Density (g/cm³) | Surface Area (m²/g) |
|---|---|---|---|
| 1 | OVD soot | 0.45 | 12 |
| 2 | Pressed soot ingot | 0.8 | 22 |
| 3 | Pressed soot ingot | 0.7 | 44 |
| 4 | OVD blank | 0.5 | 12 |
| 5 | Commercial | 0.45 | 150 |

Silica substrates 1 and 4 were made using was an outside vapor deposition (OVD) process. Octamethyltetracyclosiloxane (OMCTS) was vaporized and delivered to a burner along with $O_2$, $N_2$, and $CH_4$. The gas mixture was combusted to form silica particles. The product stream was directed onto an alumina bait rod, which was rotating and traversing relative to the burner outlet. Soot was collected as a unitary porous body on the bait rod until a desired body size was achieved. The soot body was removed from the bait rod by physically tapping the rod through the cylindrical center of the soot body. Silica substrates 2 and 3 were prepared from soot that was generated in an OMCTS combustion burner with $O_2$. Soot surface area was controlled by varying burner parameters such as OMCTS flow rate and burner temperature. Soot generated in the combustion was collected in Teflon baghouse filters and supplied as loose powders. Ingots were prepared by pressing the respective powder in a cylindrical mold under about 150 psi compaction pressure and ejecting. Silica substrate 5 was a commercial silica soot sample obtained from Evonik, Inc. (Product No. A 150).

Refractive index measurements were completed for several of the Br-doped silica glass samples. Relative refractive index values were measured at 1549 nm on sample specimens having dimensions >5 mm diameter using a Metricon prism coupler system. The relative refractive index measurements obtained from the Metricon prism coupler system were calibrated with fused silica reference samples and, where a cylindrical cane was obtained (Sample 4), against relative refractive index values obtained from the York index technique. The York datum was measured on a Photon Kinetics 104 Fiber Preform Index profile instrument. The reference samples included consolidated, chlorine-dried OVD silica ($\Delta\%=0.006$) and Ge-doped silica ($\Delta\%=0.417$). Excellent agreement in the results obtained from the Metricon system and York technique was observed for the reference samples. The relative refractive index of the Br-doped silica glass samples described herein were obtained using the Metricon system.

Example 1

Specimens (10-20 g) of silica substrates 1, 2, and 3 were loaded into the tube furnace and subjected to the following treatment schedule: (1) the substrates were heated in an $N_2$ atmosphere (P=1 atm) at a rate of 10° C./min to a temperature of 1000° C.; (2) the heated substrates were dehydrated with $Cl_2$ (2 vol % in $N_2$ at a total pressure of 1 atm) at 1000° C. for 20 min; (3) the furnace temperature was increased to 1060° C. and the furnace was purged with $N_2$ (P=1 atm) for 20 min to remove $Cl_2$; (4) the furnace was evacuated with a vacuum pump for 15 min at 1060° C. to reduce the pressure in the tube to below ~0.05 atm; (5) the substrates were doped under static vacuum at 1060° C. by heating the $SiBr_4$ liquid precursor to 130° C. to vaporize $SiBr_4$, vaporized $SiBr_4$ was delivered to the furnace tube for 30 min, the pressure of $SiBr_4$ in the tube was <0.5 atm; (6) while maintaining an $SiBr_4$ pressure of 0.45 atm in the tube, the furnace temperature was increased over a period of 45 min to 1400° C.; (7) while maintaining an $SiBr_4$ pressure of 0.45 atm, the Br-doped substrates were sintered at 1400° C. for 30 min; and (8) the furnace was turned off and the Br-doped substrates were cooled under an $N_2$ purge (P=1 atm) to room temperature to yield consolidated Br-doped silica glass samples. The Br-doped silica glass sample obtained from substrates 1, 2 and 3 in this example are identified herein as Samples 1-1, 1-2, and 1-3; respectively.

Figure 10:
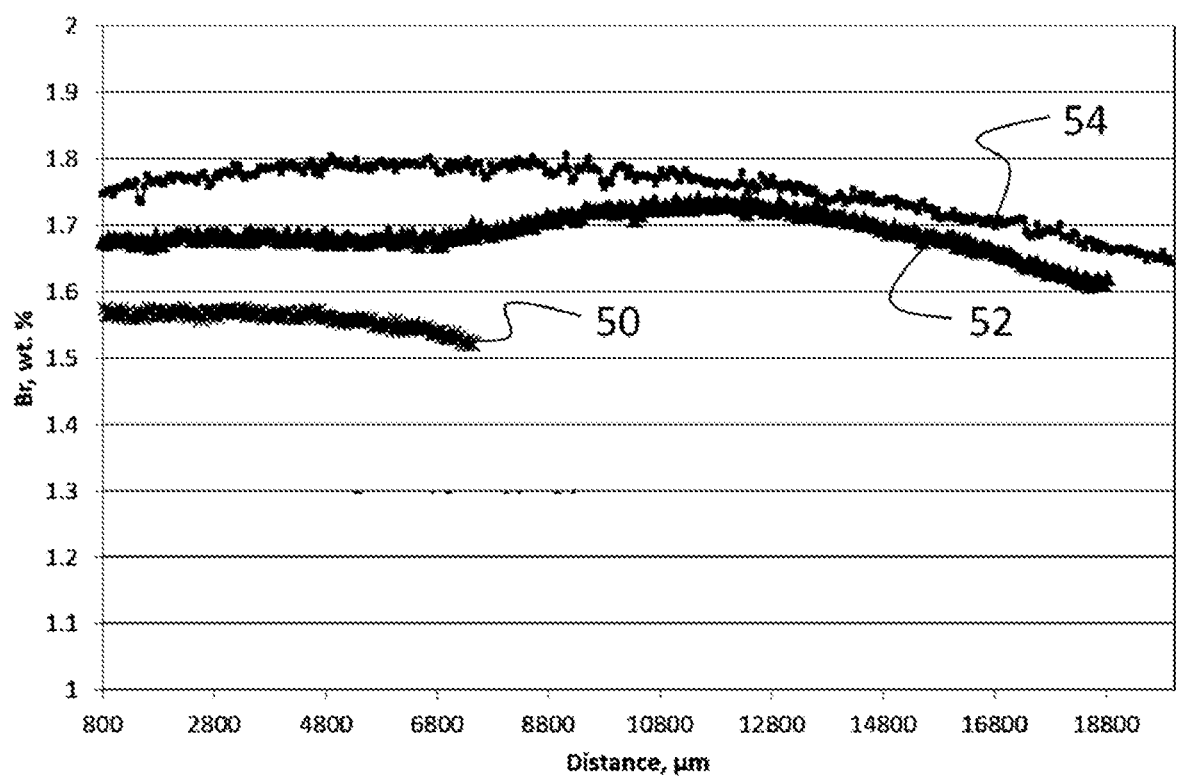
FIG. 10 depicts the concentration profile of Br in several silica glasses.

After consolidation, the three samples were cut and examined by X-ray fluorescence to determine the concentration profile of Br. FIG. 10 shows Br concentration as a function of distance (corresponding to depth from the surface) over selected representative portions of Sample 1-1 (trace 50), Sample 1-2 (trace 52), and Sample 1-3 (trace 54). The data indicate Br doping concentrations of about 1.58 wt %, 1.7 wt %, and 1.8 wt % for Samples 1-1, 1-2, and 1-3; respectively.

Example 2

In this example, silica substrates are subjected to higher $SiBr_4$ pressures than in Example 1 to achieve higher Br doping concentrations. Specimens (10-20 g) of silica substrates 1, 2, and 3 were loaded into the tube furnace and subjected to the following treatment schedule: (1) the substrates were heated in an $N_2$ atmosphere (P=1 atm) at a rate of 10° C./min to a temperature of 1000° C.; (2) the heated substrates were dehydrated with $Cl_2$ (2 vol % in $N_2$ at a total pressure of 1 atm) at 1000° C. for 20 min; (3) the furnace temperature was increased to 1060° C. and the furnace was purged with $N_2$ (P=1 atm) for 20 min to remove $Cl_2$; (4) the furnace was evacuated with a vacuum pump at 1060° C. for 15 min to reduce the pressure in the tube to <0.5 atm; (5) the substrates were doped under static vacuum at 1060° C. by heating the $SiBr_4$ liquid precursor to 150° C.-160° C. to vaporize $SiBr_4$, vaporized $SiBr_4$ was delivered to the furnace tube for 30 min, the pressure of $SiBr_4$ in the tube was 0.92 atm; (6) while maintaining an $SiBr_4$ pressure of 0.92 atm in the tube, the furnace temperature was increased over a period of 45 min to 1400° C.; (7) while maintaining an $SiBr_4$ pressure of 0.92 atm, the Br-doped substrates were sintered at 1400° C. for 30 min; and (8) the furnace was turned off and the Br-doped substrates were cooled under an air purge (P=1 atm) to room temperature to yield consolidated Br-doped silica glass samples. The Br-doped silica glass sample obtained from substrates 1, 2 and 3 in this example are identified herein as Samples 2-1, 2-2, and 2-3; respectively.

Figure 11:
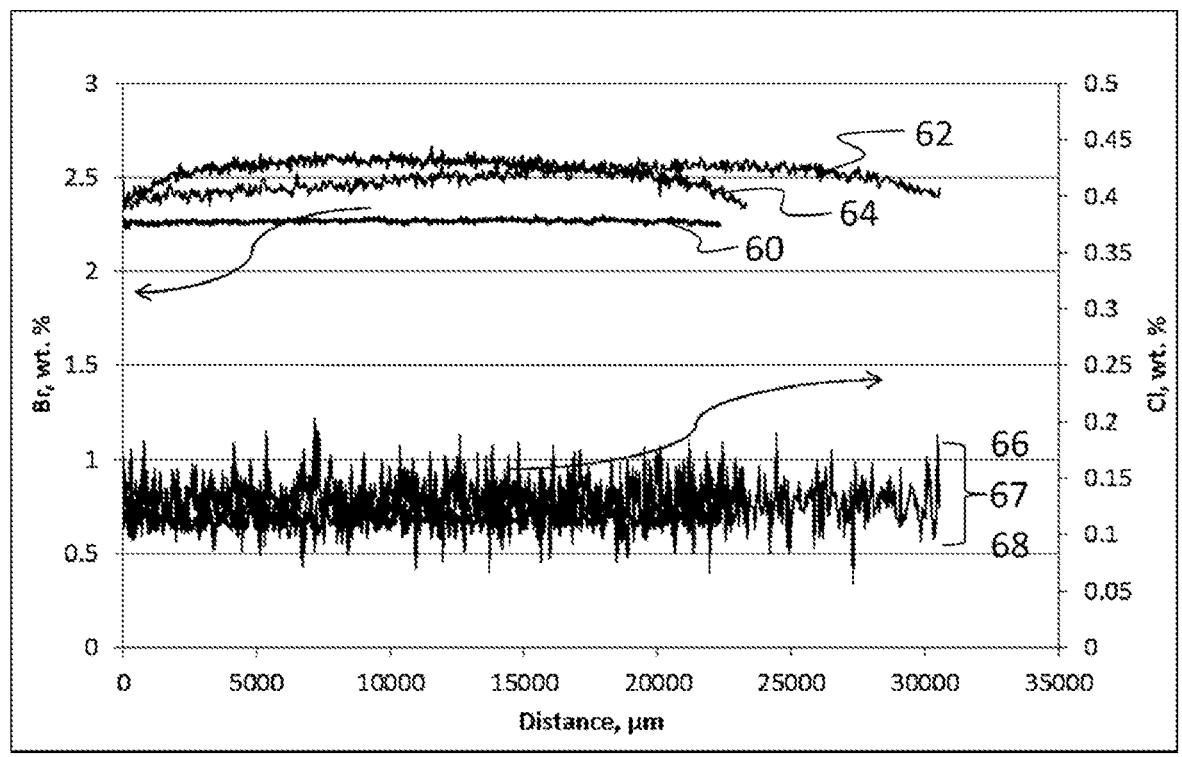
FIG. 11 depicts the concentration profiles of Br and Cl in several silica glasses.

After consolidation, the three samples were cut and examined by X-ray fluorescence to determine the concentration profile of Br. FIG. 11 shows Br concentration as a function of distance over selected representative portions of Sample 2-1 (trace 60), Sample 2-2 (trace 62), and Sample 2-3 (trace 64). The data indicate Br doping concentrations of about 2.25 wt %, 2.5 wt %, and 2.5 wt % for Samples 2-1, 2-2, and 2-3; respectively.

Corresponding experiments were performed to dope silica substrates 1, 2, and 3 with Cl under the treatment conditions of Example 2. $SiCl_4$ was used as a doping precursor for silica and the doping procedure is as described above for Br-doped Samples 2-1, 2-2, and 2-3. Similar concentration profiles for Cl were obtained for the three substrates and are depicted as overlapping traces 66, 67, and 68 in FIG. 11. A Cl doping concentration of about 0.125 wt % was observed. The data indicate that for a given process pressure, higher doping concentrations (on both a wt % basis and a mol % basis) are achieved for Br than for Cl.

Figure 12:
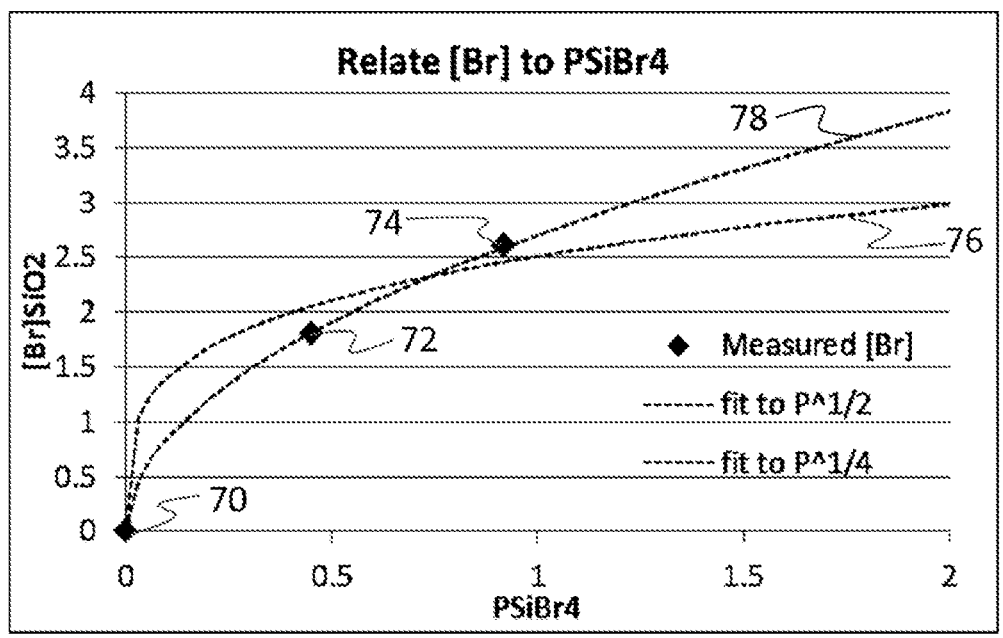
FIG. 12 shows the dependence of Br doping concentration in silica glass on the pressure of the doping precursor $SiBr_4$.

FIG. 12 combines results from Examples 1 and 2 and shows the variation in Br doping concentration ([Br]SiO2, expressed in units of wt %) as a function of pressure of the $SiBr_4$ doping precursor (PSiBr4, expressed in units of atm). Data point 70 corresponds to an undoped silica sample. Data point 72 corresponds to Sample 1-3 and data point 74 corresponds to Sample 2-3. FIG. 12 also includes power law fits to the data points. Power law fits are based on a power law relationship between Br doping concentration and $SiBr_4$ pressure:

$$[Br]SiO2 = k(PSiBr4)^x$$

where x is the power law exponent and k is a constant that is adjusted to provide the best fit of the equation to the data. Trace 76 shows the best fit using x=0.25 and trace 78 shows the best fit using x=0.5. The results indicate that a power law equation with x=0.5 provides an excellent fit to the data. Similar data for Cl doping of silica glass indicate that the dependence of doping concentration on pressure of the $SiCl_4$ precursor is best described by a power law equation with x=0.25. The results indicate that doping of silica with Br using $SiBr_4$ is more sensitive to pressure than doping of silica with $SiCl_4$. This observation is consistent with the higher doping concentrations observed for Br relative to Cl at a fixed process pressure.

Figure 13:
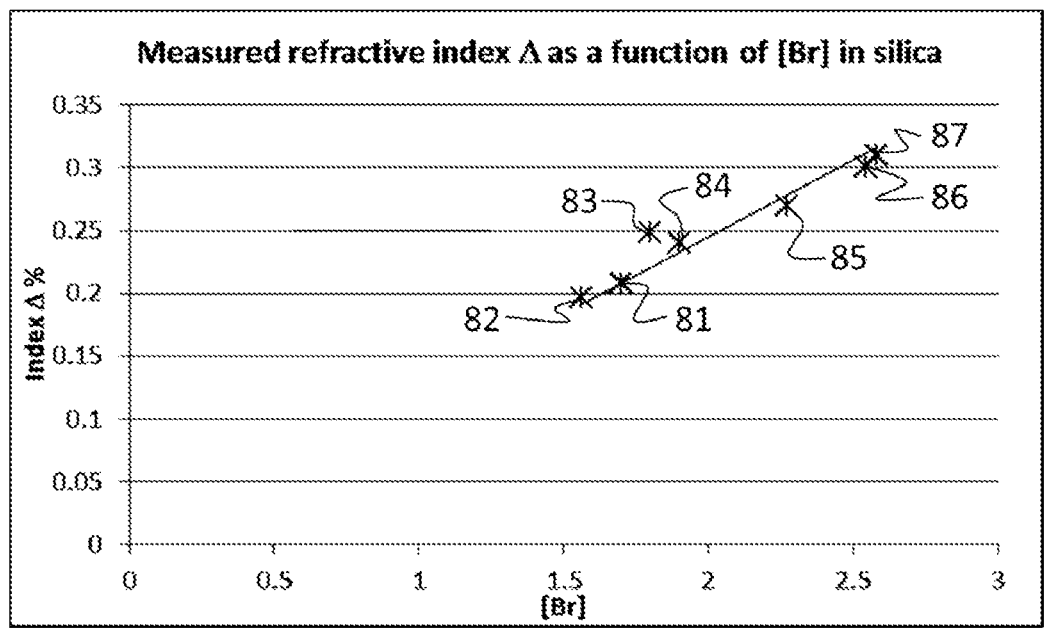
FIG. 13 shows the relative refractive index of silica glass as a function of Br doping concentration.

FIG. 13 shows measurements of the relative refractive index 4% of silica glass as a function of Br doping concentration (wt %). Data point 81 corresponds to a sample described in Example 3 below having a Br doping concentration of 1.63 wt %. Data points 82, 83, and 84 correspond, respectively, so Samples 1-1, 1-2, and 1-3. Data points 85, 86, and 87 correspond, respectively, so Samples 2-1, 2-2, and 2-3. A best line fit to the data is shown. The results indicate that the relative refractive index 4% of the classes increases by about 0.125 for each increase of 1 wt % in Br doping concentration. By contrast, data for Cl-doped silica (not shown) indicates that a 1 wt % increase in Cl doping concentration leads to an increase in 4% of only 0.075.

Example 3

In this example, a Br-doped silica glass article suitable for use as a core cane in fiber production is described. Silica substrate 4 (length ~18", weight ~80 g) was placed in the tube furnace and was subjected to the following treatment schedule: (1) the substrate was heated in an $N_2$ atmosphere (P=1 atm) at a rate of 10° C./min to a temperature of 1060° C.; (2) the heated substrate was dehydrated with $Cl_2$ (2 vol % in $N_2$ at a total pressure of 1 atm) at 1060° C. for 1 hr; (3) the furnace temperature was maintained at 1060° C. and the furnace was purged with $N_2$ (P=1 atm) for 30 min to remove $Cl_2$; (4) the furnace was evacuated with a vacuum pump at 1060° C. for 30 min to reduce the pressure in the tube to <0.5 atm; (5) the substrate was doped under static vacuum at 1060° C. by heating the $SiBr_4$ liquid precursor to 147° C. to vaporize $SiBr_4$, vaporized $SiBr_4$ was delivered to the furnace tube for 60 min, the pressure of $SiBr_4$ in the tube was ~1 atm; (6) while maintaining an $SiBr_4$ pressure of ~1 atm in the tube, the furnace temperature was increased over a period of 45 min to 1400° C.; (7) while maintaining an $SiBr_4$ pressure of ~1 atm, the Br-doped substrate was sintered at 1400° C. for 30 min; and (8) the furnace was turned off and the Br-doped substrates were cooled under an air purge (P=1 atm) to room temperature to yield a consolidated Br-doped silica glass core cane. The core cane was dense and opaque white in color. A segment of the core cane was analyzed by X-ray fluorescence and the Br doping concentration was found to be 1.63 wt %. The core cane was fitted with a handle and driven through the hot zone of a consolidation furnace to clear up the glass. A highly transparent core cane suitable for fiber draw and manufacture was obtained.

Example 4

In this example, co-doping of silica glass with Cl and Br is demonstrated.

Figure 14:
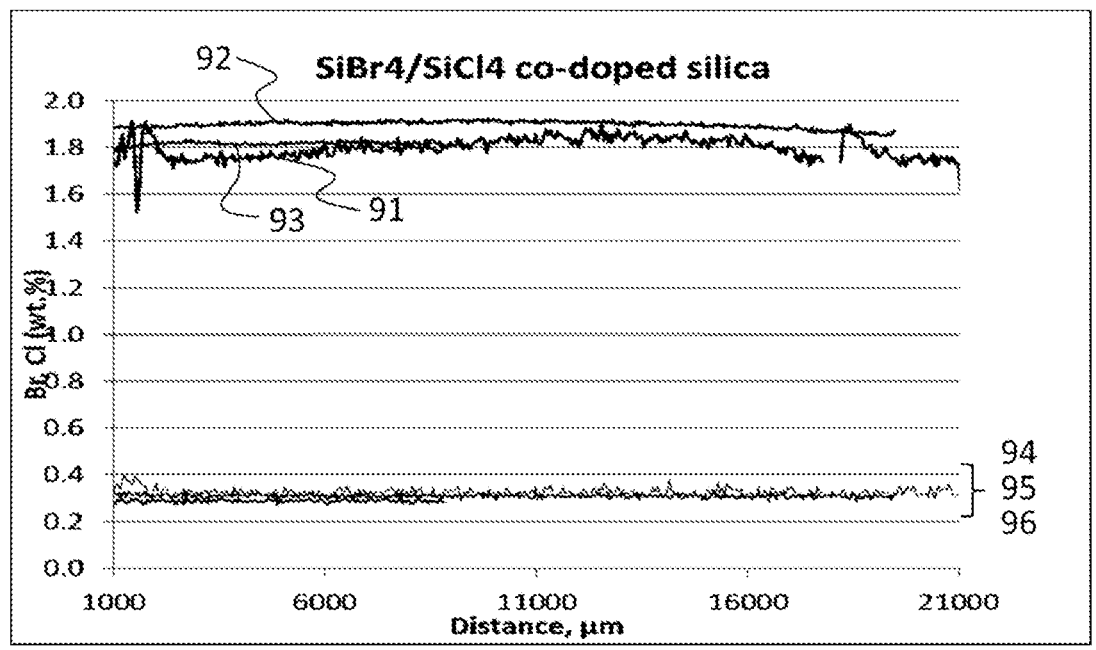
FIG. 14 depicts the concentration profiles of Br and Cl in several co-doped silica glasses.

Specimens (10-20 g) of silica substrates 2, 3, and 5 were loaded into the tube furnace and subjected to the following treatment schedule: (1) the substrates were heated in an $N_2$ atmosphere (P=1 atm) at a rate of 10° C./min to a temperature of 1000° C.; (2) the heated substrates were dehydrated with $Cl_2$ (2 vol % in $N_2$ at a total pressure of 1 atm) at 1000° C. for 20 min; (3) the furnace temperature was increased to 1060° C. and the furnace was purged with $N_2$ (P=1 atm) for 20 min to remove $Cl_2$; (4) the furnace was evacuated with a vacuum pump at 1060° C. for 15 min to reduce the pressure in the tube to below ~0.05 atm; (5) the substrates were doped with Br under static vacuum at 1060° C. by heating the $SiBr_4$ liquid precursor to 130° C. to vaporize $SiBr_4$, vaporized $SiBr_4$ was delivered to the furnace tube for 30 min, the pressure of $SiBr_4$ in the tube was 0.45 atm; (6) while maintaining an $SiBr_4$ pressure of 0.45 atm in the tube, doping with Cl occurred by introducing $SiCl_4$ to the tube furnace at a pressure of 0.5 atm (total tube pressure 0.95 atm); (7) as Cl doping occurred, the furnace temperature was increased over a period of 40 min to 1400° C.; (8) while maintaining an $SiBr_4$ pressure of 0.45 atm and an $SiCl_4$ pressure of 0.5 atm, the Br-, Cl-doped substrates were sintered at 1400° C. for 30 min; and (9) the furnace was turned off and the Br-, Cl-doped substrates were cooled under an $N_2$ purge (P=1 atm) to room temperature to yield consolidated silica glass samples co-doped with Br and Cl. The co-doped silica glass sample obtained from substrates 2, 3 and 5 in this example are identified herein as Samples 4-2, 4-3, and 4-5; respectively X-ray fluorescence measurements on the co-doped glasses were performed to determine the doping concentrations of Br and Cl as a function of distance over selected representative portions of Samples 4-2, 4-3, and 4-5. The results are shown in FIG. 14. Traces 91, 92, and 93 show the Br doping concentration of Samples 4-2, 4-3, and 4-5, respectively. Traces 94, 95, and 96 show the Cl doping concentration of Samples 4-2, 4-3, and 4-5, respectively. Similar doping concentrations of Br and Cl were observed for the samples. The Br doping concentration was 1.8 wt %-1.9 wt % and the Cl doping concentration was about 0.3 wt %.

Doping of a silica soot body may be achieved by exposing the heated silica soot body to vaporized $SiBr_4$. The time of exposure of a silica soot body to vaporized $SiBr_4$ may be at least 5 min, or at least 10 min, or at least 15 min, or at least 30 min, or in the range from 1 min-60 min, or in the range from 5 min-45 min, or in the range from 10 min-35 min.

Formation of vaporized $SiBr_4$ may be accomplished by heating liquid $SiBr_4$. The temperature of heating may be at least 100° C., or at least 110° C., or at least 120° C., or at least 130° C., or at least 140° C., or in the range from 100° C.-200° C., or in the range from 100° C.-175° C., or in the range from 100° C.-155° C., or in the range from 110° C.-150° C., or in the range from 120° C.-145° C. Vaporized $SiBr_4$ may also be formed by injecting liquid $SiBr_4$ into a hot vapor stream and passing the vapor stream over the silica soot body.

Example 5

In this example, a fiber was drawn from a preform that included a Br-doped core element. The spectral attenuation of the Br-doped fiber was also compared to the spectral attenuation of a $GeO_2$-doped optical fiber.

The fiber with a bromine-doped core was prepared by the following two-step rod-in-soot procedure:

Step 1:

A core segment was first made. A 2507 g, 1-meter long soot blank was deposited onto a bait rod using a $SiCl_4$-based flame hydrolysis method. After removing the bait rod, the soot blank was placed in a consolidation furnace equipped with a $SiBr_4$ bubbler system. The bubbler was set to a temperature of about 153° C. to provide a vapor pressure of about 0.55 atm in a 2 slpm He carrier gas stream. The soot blank was subjected to the following treatment conditions in the consolidation furnace:

| Step | Ramp rate | Temperature | Gas flow | Time (min) |
|---|---|---|---|---|
| Preheat | NA | 1175° C. | He | 30 |
| Dry | NA | 1175° C. | 5% $Cl_2$ in He | 60 |
| Dope | 1° C./min | 1200° C. | 55% $SiBr_4$ in He | 40 |
| Sinter | 16 mm/min | 1540° C. | 55% $SiBr_4$ in He | |

The sintered blank was cooled and redrawn to Br-doped glass core canes having a diameter of 8 mm. The refractive index of the core canes was 0.23 Δ% relative to silica.

Step 2:

An inner clad portion of the fiber was made using a rod-in-soot method. A 1773 g, 1-meter long soot blank was prepared by a method similar to the one described in Step 1 for the core blank. After removal of the inner clad soot blank from the bait rod, the 8 mm diameter Br-doped core cane produced in Step 1 was positioned in the central cavity along the centerline of the inner clad soot blank. A consolidation sequence was then completed using the following procedure: a $Cl_2$ dry step, a fluorine doping step and a downdrive sinter step. The conditions used in the consolidation sequence were:

| Step | Ramp rate | Temperature | Gas flow | Time |
|---|---|---|---|---|
| Preheat | NA | 1200° C. | 1% $O_2$ in He | 45 min |
| Dry | NA | 1200° C. | 3% $Cl_2$ in He | 75 min |
| Dope | NA | 1200° C. | 2.5% $SiF_4$ in He | 60 min |
| Sinter | 5 mm/min | 1450° C. | 1% $SiF_4$ in He | |

Figure 15:
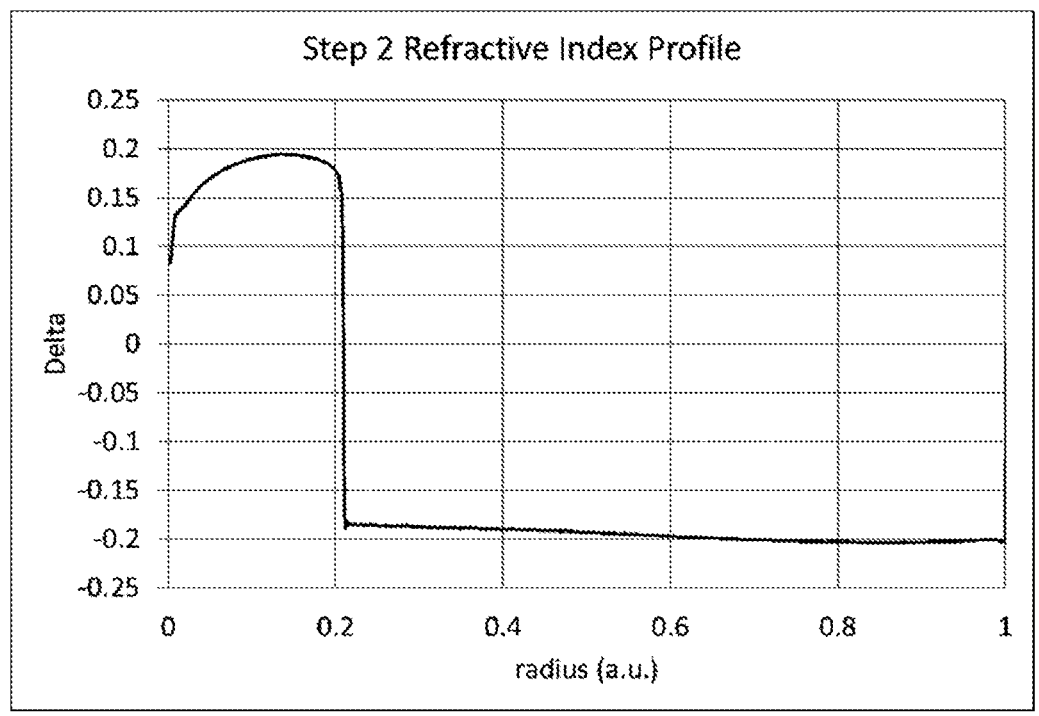
FIG. 15 shows the relative refractive index of a consolidated glass cane that includes a Br-doped core region and an F-doped inner clad region.

The consolidated blank (with Br-doped core and F-doped inner clad portions) was again redrawn to 8 mm diameter consolidated glass canes. The refractive index profile was measured using a Photon Kinetics P106 preform analyzer, referenced to a silica index of 1.444374@ 1550 nm. The refractive index profile is shown in FIG. 15.

One of the canes prepared in Step 2 was selected for a final overclad. 1015 g of soot were deposited directly onto a 1 meter long portion of the selected cane. The resulting soot blank was consolidated with the following procedure:

| Step | Ramp rate | Temperature | Gas flow | Time |
|---|---|---|---|---|
| Preheat | NA | 1200° C. | 1% $O_2$ in He | 45 min |
| Dry | NA | 1200° C. | 3% $Cl_2$ in He | 75 min |
| Dope | NA | 1200° C. | 2.5% $SiF_4$ in He | 60 min |
| Sinter | 5 mm/min | 1450° C. | 1% $SiF_4$ in He | |

Figure 16:
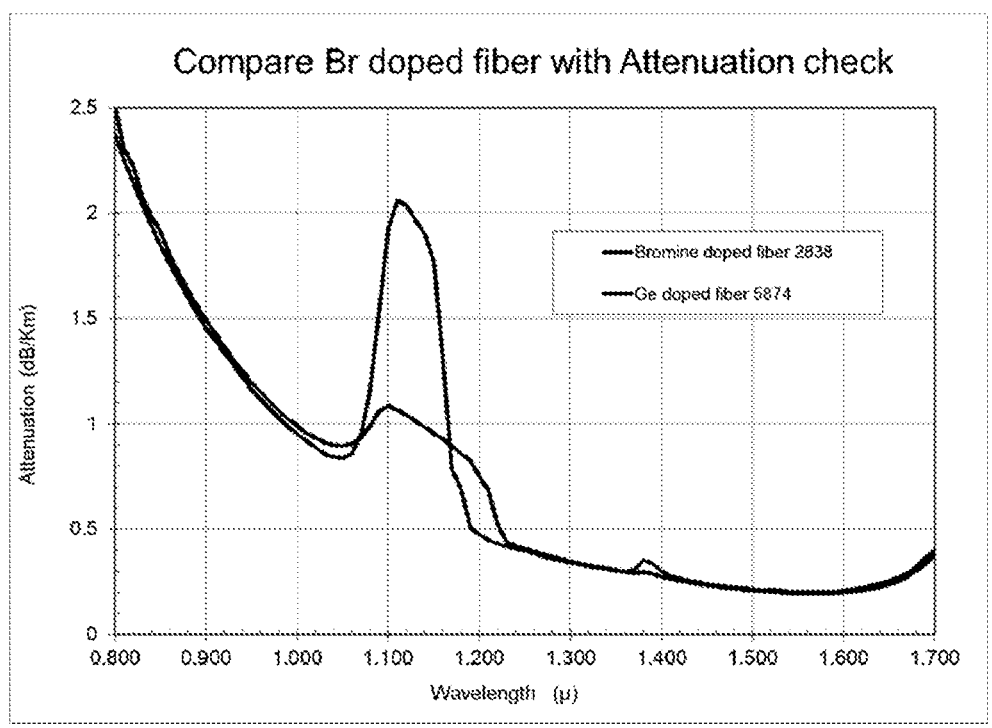
FIG. 16 shows a comparison of spectral attenuation for a Br-doped optical fiber and a $GeO_2$-doped optical fiber.

The final consolidated blank (which included a Br-doped core, an F-doped inner clad, and an F-doped overclad) was drawn to fiber. The spectral attenuation of the fiber was measured on a 3 km length using a PK2500 Optical Fiber Analysis System. The spectral attenuation of the fiber is compared to the spectral attenuation of a $GeO_2$-doped fiber produced on the same process equipment in FIG. 16. A comparison of the attenuation shows a largely similar optical loss at all wavelengths of interest for the Br-doped and $GeO_2$-doped fibers.

| Wavelength (nm) | Attenuation of fiber with Br-doped core (dB/km) | Attenuation of fiber with $GeO_2$-doped core (dB/km) |
|---|---|---|
| 1000 | 0.952 | 0.990 |
| 1310 | 0.334 | 0.338 |
| 1550 | 0.204 | 0.195 |

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. An optical fiber comprising:
   a core, said core comprising silica glass doped with Br, said Br having a concentration in the range from 1.5 wt %-3.0 wt % and a relative refractive index at a wavelength of 1549 nm greater than or equal to 0.20% in said core; and
   a cladding surrounding said core, said cladding comprising silica glass.

2. The optical fiber of claim 1, further comprising Cl.

3. The optical fiber of claim 1, wherein said cladding comprises Br.

4. The optical fiber of claim 1, wherein said concentration of Br in said silica glass of said core is in the range from 1.75 wt %-2.75 wt %.

5. The optical fiber of claim 1, wherein said core further comprises Cl.

6. The optical fiber of claim 1, wherein said cladding includes an inner cladding and an outer cladding, said inner cladding having a lower relative refractive index than said outer cladding and said outer cladding having a lower relative refractive index than said core.

7. The optical fiber of claim 6, wherein said inner cladding comprises silica glass doped with F.

8. The optical fiber of claim 7, wherein the concentration of F in said silica glass of said inner cladding is in the range from 0.05 wt %-0.80 wt %.

9. The optical fiber of claim 6, wherein said outer cladding comprises silica glass doped with Br.

10. The optical fiber of claim 1, wherein said core has a relative refractive index in the range from 0.30%-0.45%.

11. The optical fiber of claim 6, wherein said core has a relative refractive index in the range from 0.25%-0.50%.

12. The optical fiber of claim 11, wherein said outer cladding has a relative refractive index in the range from 0.05%-0.20%.

13. The optical fiber of claim 1, wherein said core has a relative refractive index $\Delta_1$ in the range from 0.20% to 0.55%.

14. The optical fiber of claim 1, wherein said silica glass of said cladding lacks Br.

15. The optical fiber of claim 1, wherein said Br is a sole dopant in said core.

* * * * *